US00RE44606E

(19) United States
(12) Reissued Patent
Herz et al.

(10) Patent Number: US RE44,606 E
(45) Date of Reissued Patent: Nov. 19, 2013

(54) METHOD AND APPARATUS FOR ESTABLISHING AD HOC COMMUNICATIONS PATHWAYS BETWEEN SOURCE AND DESTINATION NODES IN A COMMUNICATIONS NETWORK

(75) Inventors: Frederick S. M. Herz, Warrington, PA (US); Jonathan M. Smith, Princeton, NJ (US); Bhupinder Madan, Basking Ridge, NJ (US)

(73) Assignee: Perdiso Co. Limited Liability Company, Wilmington, DE (US)

(21) Appl. No.: 13/360,249

(22) Filed: Jan. 27, 2012

Related U.S. Patent Documents

Reissue of:
(64) Patent No.: 7,463,890
Issued: Dec. 9, 2008
Appl. No.: 11/412,600
Filed: Apr. 26, 2006

U.S. Applications:
(63) Continuation of application No. 10/202,732, filed on Jul. 24, 2002, now abandoned.

(60) Provisional application No. 60/307,330, filed on Jul. 24, 2001.

(51) Int. Cl.
*H04W 40/00* (2009.01)

(52) U.S. Cl.
USPC ..... 455/445; 455/41.2; 455/3.01; 455/422.1; 455/421; 455/428; 370/229; 370/235; 370/236; 370/237; 370/238

(58) Field of Classification Search
USPC ..... 455/445, 41.2, 3.01, 422.1, 421, 428; 370/229, 235, 236, 237, 238
See application file for complete search history.

(56) References Cited

U.S. PATENT DOCUMENTS

| | | | |
|---|---|---|---|
| 5,623,495 | A | 4/1997 | Eng et al. |
| 5,678,196 | A | 10/1997 | Doyle |
| 5,754,938 | A | 5/1998 | Herz et al. |
| 5,754,939 | A | 5/1998 | Herz et al. |
| 5,822,309 | A | 10/1998 | Ayanoglu et al. |
| 5,826,195 | A | 10/1998 | Westerlage et al. |
| 5,951,623 | A | 9/1999 | Reynar et al. |
| 5,953,319 | A | 9/1999 | Dutta et al. |
| 5,987,011 | A | 11/1999 | Toh |

(Continued)

OTHER PUBLICATIONS

ARO/DARPA Workshop on Mobile Ad Hoc Networking, University of Maryland, Institute for Systems Research, Mar. 14, 1997, 3 pages.

(Continued)

*Primary Examiner* — Vladimir Magloire
(74) *Attorney, Agent, or Firm* — Woodcock Washburn LLP

(57) ABSTRACT

Autoband's distributed networking intelligence provides a novel architecture capable of dynamically reconfiguring communications pathways consisting of links whose transmission media are opportunistically and dynamically selectable. At least one constituent node in such automatically configurable transient pathways is mobile, for example, information (source) server, intervening router node(s), gateway server and/or client device. Additionally, Autoband's ad hoc communications pathways may seamlessly and dynamically integrate (i.e., "graft") into standard fixed node networks such as terrestrial networks, other wireless networks or combinations thereof. These communications may consist of point-to-point or multicast links. An economic market-based approach further assures allocation of available network resources (i.e., bandwidth and processing) needed to achieve the most optimally resource efficient communications pathway configurations for the totality of communications. Consequently, optimal network resource allocation and efficiency at a system-wide level is continuously achieved.

19 Claims, 1 Drawing Sheet

(56) References Cited

U.S. PATENT DOCUMENTS

| | | | |
|---|---|---|---|
| 6,014,566 | A | 1/2000 | Owada |
| 6,115,580 | A | 9/2000 | Chuprun et al. |
| 6,175,743 | B1 | 1/2001 | Alperovich et al. |
| 6,307,843 | B1 | 10/2001 | Okanoue |
| 6,400,682 | B1 | 6/2002 | Regula |
| 6,571,111 | B1 | 5/2003 | Mayo et al. |
| 6,603,428 | B2 | 8/2003 | Stilp |
| 6,625,135 | B1 | 9/2003 | Johnson et al. |
| 6,735,448 | B1 | 5/2004 | Krishnamurthy et al. |
| 6,748,233 | B1 | 6/2004 | Arnold et al. |
| 6,748,246 | B1 | 6/2004 | Khullar |
| 6,839,614 | B1 | 1/2005 | Timko et al. |
| 6,904,275 | B2 | 6/2005 | Stanforth |
| 6,934,558 | B1 | 8/2005 | Sainton et al. |
| 7,233,574 | B2 | 6/2007 | Worfolk et al. |
| 7,463,890 | B2 | 12/2008 | Herz et al. |
| 8,046,835 | B2 | 10/2011 | Herz |
| 8,160,586 | B2 | 4/2012 | Herz et al. |
| 2002/0028656 | A1 | 3/2002 | Yemini et al. |
| 2002/0049561 | A1 | 4/2002 | Garcia-Luna-Aceves et al. |
| 2002/0105913 | A1 | 8/2002 | Miya |
| 2003/0005074 | A1 | 1/2003 | Herz et al. |
| 2003/0025964 | A1 | 2/2003 | Herz et al. |
| 2003/0153338 | A1 | 8/2003 | Herz et al. |
| 2003/0203717 | A1 | 10/2003 | Chuprun et al. |
| 2005/0009506 | A1 | 1/2005 | Smolentzov et al. |
| 2005/0020275 | A1 | 1/2005 | Agrawala et al. |
| 2006/0069749 | A1 | 3/2006 | Herz et al. |
| 2009/0254971 | A1 | 10/2009 | Herz et al. |

OTHER PUBLICATIONS

Baker et al., "Flat vs. Hierarchical Network Control Architecture," ARO/DARPA Workshop on Mobile Ad-Hoc Networking, http://www.isr.umd.edu/Courses/Workshops/MANET/program.html, Mar. 1997, 1 page.

Briesemeister et al., "Role-Based Multicast in Highly Mobile but Sparsely Connected Ad Hoc Networks," Proceedings of the ACM/IEEE Workshop on Mobile Ad Hoc Networking and Computing (MOBIHOC), Boston, MA, Aug. 2000, 45-50.

Broch et al., "The Dynamic Source Routing Protocol For Mobile Ad Hoc Networks," Internet Draft, IETF Mobile Ad Hoc Networking Working Group, Mar. 13, 1998, 44 pages.

Corson et al., "Mobile Ad hoc Networking (MANET): Routing Protocol Performance Issues and Evaluation Considerations," Internet Draft, draft-ietf-manet-issues-00, Sep. 1997, 1-9.

Corson et al., "Mobile Ad hoc Networking (MANET): Routing Protocol Performance Issues and Evaluation Considerations," RFC 2501, IETF Network Working Group, Jan. 1999, 1-13.

Corson et al., "Mobile ad hoc networking (MANET): Routing protocol performance issues and evaluation considerations," Internet-Draft, Oct. 1998, 1-12.

Corson, et al., Internet-Based Mobile Ad Hoc Networking, IEEE Internet Computing, 3(4), Jul.-Aug. 1999, 1-8.

Corson, M. S., "Flat scalability—fact or fiction?," ARO/DARPA Workshop on Mobile Ad Hoc Networking, Mar. 1997, 11 pages.

Gerla et al., "Tree Multicast Strategies in Mobile, Multihop Wireless Networks," ACM/Baltzer Mobile Networks and Applications, special issue on Mobile Ad Hoc Networking, Oct. 1999, 4(3), 193-207.

Haas et al., "The zone routing protocol (ZRP) for ad hoc networks," Internet Draft, IETF Mobile Ad Hoc Networking Working Group, Aug. 1998, 1-41.

Heinzleman et al., "Adaptive protocols for information dissemination in wireless sensor networks", Proceedings of the 5th annual ACM/IEEE international conference on Mobile computing and networking (MobiCom '99), Aug. 15-20, 1999, 174-185.

Heinzleman et al., "Energy-scalable algorithms and protocols for wireless microsensor networks", Proc. International Conference on Acoustics, Speech, and Signal Processing (ICASSP '00), Jun. 5-9, 2000, vol. 6, 3722-3725.

Jiang et al., "Cluster based routing protocol (CBRP) functional specification," Internet Draft, Aug. 1998, IETF Mobile Ad Hoc Networking Working Group, 1-13.

Lee et al., "INSIGNIA: Inband Signaling Support for QOS in Mobile Ad Hoc Networks", Proceedings of 5th Intl. Workshop on Mobile Multimedia Communication MoMuc'98, Oct. 12-14, 1998, 19-30.

Lee et al., "Neighbor Supporting Ad hoc Multicast Routing Protocol," Proceedings of the ACM/IEEE Workshop on Mobile Ad Hoc Networking and Computing (MOBIHOC), Boston, MA, Aug. 2000, 37-44.

Macker et al., "Mobile ad hoc networking and the IETF," ACM Mobile Computing and Communications Review, 1998, 2(1), 9-14.

Marchent et al., "Transport Interworking between 3rd Generation Mobile Systems and ATM Fixed Network," Globecom'96, 1, Mobile Ad Hoc Networking Terminology, http://www.ietf.org, Nov. 1998, 252-256.

Park et al., "Temporally-ordered routing algorithm (TORA) version 1. Functional Specification," Internet Draft, IETF Mobile Ad Hoc Networking Working Group, Aug. 1998, 1-21.

Park, et al., "Temporally-Ordered Routing Algorithm (TORA)," Internet Draft, Mobile Ad Hoc Networking Working Group, Jul. 20, 2001, 20 pages.

Parkes, D.C., "Iterative combinatorial auctions: Achieving economic and computational efficiency", Doctoral Dissertation in Computer and Information Science, University of Pennsylvania, May 2001, 346 pages.

Pei et al., "LANMAR: Landmark Routing for Large Scale Wireless Ad Hoc Networks with Group Mobility," Proceedings of the ACM/IEEE Workshop on Mobile Ad Hoc Networking and Computing (MOBIHOC), Boston, MA, Aug. 2000, 11-18.

Perkins et al., "Ad hoc On-Demand Distance Vector (AODV) Routing," Second IEEE Workshop on Mobile Computing Systems and Applications, 1999. Proceedings. WMCSA '99, Feb. 25-26, 1999, 90-100.

Perkins, "Ad Hoc On-Demand Distance Vector (AODV) Routing," Internet Draft, Mobile Ad Hoc Networking (MANET) Working Group of the Internet Engineering Task Force (IETF), Oct. 19, 2003, 27 pages.

Perkins, C. E., "Mobile Ad Hoc Networking Terminology, draft-ietf-manet-term-01.txt," Internet Engineering Task Force, Internet Draft, Nov. 17, 1998, 11 pages.

Qiao, et al., "Load Balancing Via Relay in next Generation Wireless Systems," Proceeding of IEEE Mobile Ad Hoc Networking & Computing, 2000, 1 page (Abstract Only).

Sass, P., "Communications Networks for the Force XXI Digitized Battlefield," ACM/Baltzer Mobile Networks and Applications, special issue on Mobile Ad Hoc Networking, Aug. 1999, 4(3), 139-155.

Subramanian et al., "An Architecture for Building Self-Configurable Systems," IEEE/ACM Workshop on Mobile Ad Hoc Networking and Computing, Aug. 2000, 63-73.

Todd et al., "Low power rendezvous in embedded wireless networks", Proceedings of 1st Workshop on Mobile Ad Hoc Networking and Computing, MobiHOC, Aug. 11, 2000 (Abstract Only).

Zhou et al., "Content Based Multicast (CBM) in Ad Hoc Networks," Proceedings of the ACM/IEEE Workshop on Mobile Ad Hoc Networking and Computing (MOBIHOC), Boston, MA, Aug. 2000, 51-60.

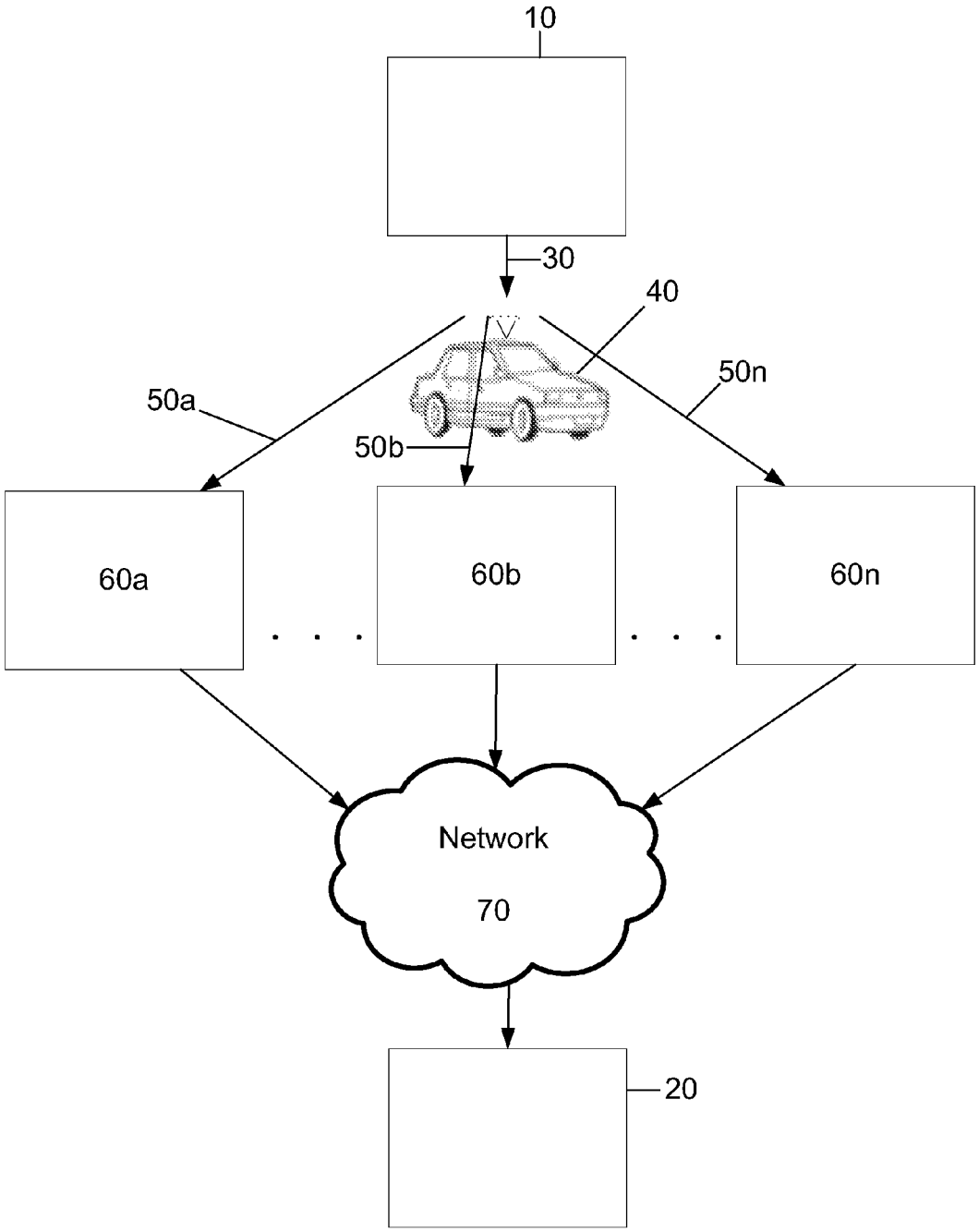
10
30
40
50a
50b
50n
60a
60b
60n
Network
70
20

METHOD AND APPARATUS FOR ESTABLISHING AD HOC COMMUNICATIONS PATHWAYS BETWEEN SOURCE AND DESTINATION NODES IN A COMMUNICATIONS NETWORK

Matter enclosed in heavy brackets [ ] appears in the original patent but forms no part of this reissue specification; matter printed in italics indicates the additions made by reissue.

CROSS-REFERENCE TO RELATED APPLICATIONS

The present patent application claims domestic priority from [co-pending] U.S. patent application Ser. No. 10/202,732 *which is a continuation of*, filed Jul. 24, 2002*, and now abandoned, which claims the benefit under 35 U.S.C. §119(e) of U.S. provisional application Ser. No. 60/307,330, filed Jul. 24, 2001*. The content of [that patent application] *U.S. patent application Ser. No. 10/202,732, filed Jul. 24, 2002*, is incorporated by reference in its entirety.

FIELD OF THE INVENTION

The present invention relates to a method and apparatus for communication amongst stationary and mobile nodes and, more particularly, to a method and apparatus for providing ad hoc communication over variable mobile communications pathways that may become available at any given time.

BACKGROUND OF THE INVENTION

The rapid proliferation in the number and diversity of communication devices, mobile networks and other types of communication channels available to the public portends the emergence of new opportunities never before possible to enhance the quality, speed and efficiency of communication between clients and servers through a diverse group of communications channels and networks. However, not all the channels available have been utilized up to this point to better serve the ever increasing ubiquitous communications needs of the public. A communication system is desired that is equipped with the necessary distributed ad hoc networking intelligence that is required to assess and thus capitalize on the substantial communication opportunities wherever and whenever they present themselves. For example, when a computer user working on his desktop at home or office receives a packet of information while trying to download a file from the Internet, invariably the packet is received from the standard channels of communication, which may be a combination of phone lines, cable lines, and network lines. However, there are users, who may be holding wireless devices, who are not directly connected to the Internet via the above-mentioned normal channels of a terrestrial network. In those cases, the proximity of other wireless devices in the 'vicinity' of the user's device could lead to many more paths to choose from for an efficient communication. The 'vicinity' could be dependent upon many conditions such as the ability to use different transmission modalities that are, in turn, dependent on factors such as weather, other intervening visually obstructing objects, etc.

By utilizing potentially any dynamic ad hoc communications pathway in which at least one constituent node is mobile, a plethora of potential multi-nodal network configurations may become accessible, including variations of scenarios in which the information (source) server is mobile, the intervening router node(s) is/are mobile, the gateway server is mobile, and/or the client device is mobile. Ideally, all communications could be of any type, including point-to-point and multicast. Additionally, it is desired that the ad hoc communications pathway seamlessly and dynamically interface as well as integrate (i.e., "graft") into a standard fixed node terrestrial network such as terrestrial networks, other wireless networks or any combination thereof. A market-based economic approach is also desired to assure that the allocation of available network resources needed to achieve the most efficient communications pathway for a given communications need are optimally selected so as to achieve optimal resource allocation and overall efficiency at a system-wide level.

Such a system has not heretofore been available in the art. The present invention is directed to an ad hoc system that addresses this need in the communications art.

SUMMARY OF THE INVENTION

The invention provides an opportunistic system-wide architecture involving communications network modalities including routing, caching and transmission by which an optimally efficient communication pathway is achieved on an ad hoc and opportunistic basis in which at least one of the nodes constituting any given transmission pathway is mobile. A principal objective is to opportunistically capitalize on these potential opportunities for optimal communication efficiency as they present themselves dynamically. An important component of the determination of these optimal ad hoc communication pathways for delivering any desired transmission to its appropriate destination is the integration of network level distributed routing intelligence which utilizes a multi variable market model.

BRIEF DESCRIPTION OF THE DRAWINGS

FIG. 1 illustrates an exemplary ad hoc communications network in accordance with the invention.

DETAILED DESCRIPTION OF ILLUSTRATIVE EMBODIMENTS

System Description

The prerequisite for a communication system in accordance with the invention is that at least one of the components (server, router, gateway server and/or the client processor) is present on a moving object and, in addition, such component does not have a direct physical connection with the rest of the components such that devices and network connections associated with a diverse range of transmission modalities may be utilized in order to initially establish and/or maintain the communications pathway. For example, it is very probable that during the next decade the wireless landscape will be such that most vehicles will be equipped for reception, transmission, and retransmission routing of high speed signals. Additionally there will be a prevalence of a variety of portable wireless devices: cell phones, PDAs, digital cameras, wearable computers etc. Potentially all of these types of wireless nodes could be tied into the network of the invention (hereafter referred to as "Autoband"). In this environment, it certainly would be reasonable for the high speed home LAN to extend as far as the nearest road or street. Depending upon the dynamically generated connectivity strategy by the Autoband's internal intelligence, it would be selectively possible to utilize the LAN of a particular home in the proximity of the passing vehicle. In theory, the extended range of the LAN of the particular home could revert to its normal range once the vehicle passed into an area that is within the limit of the LAN of a neighboring home, thus assuring a persistent high-speed connection to the vehicle at all times. If the street or roadway has considerable traffic such that a high-speed line-of-sight chain link pathway is achieved, only one of the vehicles at any one time would require this high-speed connection to a local home LAN.

Autoband Network Configurations

FIG. 1 illustrates an exemplary ad hoc communications network in accordance with the invention. By way of example, FIG. 1 illustrates a communication pathway between a source node 10 and a destination node 20 for transmission of a predetermined quantity of data. As illustrated, a communications link 30 is established between the source node 10 and an intermediate node 40. In this case, the intermediate node 40 is illustrated as a moving node on a vehicle, for example. However, it will be appreciated that the source node 10 and/or intermediate node may be moving or stationary. In this example, the source node 10 and the intermediate node 40 stay in wireless communication range of each other in a selected wireless transmission modality long enough to permit transmission of a quantity of data from the source node 10 to the intermediate node 40 via communications link 30. Intermediate node 40 then selects one or more of a number of communications links 50a, 50b, . . . 50n based on dynamically changing transmission conditions and dynamically available transmission modalities. The communication link 50a, 50b, . . . 50n is dynamically selected that is determined (or predetermined) to allow transfer of the quantity of data to a further node 60a, 60b, . . . 60n. Each further node 60a, 60b, . . . 60n may also dynamically select a communications link in the same manner until a node in an existing fixed node network, an existing wireless network, or a combination of the two (identified generally as 70) is connected to that is, in turn, connected to destination node 20. It will be appreciated that respective communications between the source node 10 and the destination node 20 may pass through one or more different dynamically selectable communications links 30 due to different transmission conditions at different times and/or different available transmission modalities or movable intermediate nodes 40 in communications range of the source node 10 and/or destination node 20 at different communication times. Different embodiments of such a network will be described below.

The network configuration of Autoband is different from the normal terrestrial network in one simple aspect in that one of the components in the Autoband system is part of a device in a moving object such as a vehicle, a train, an airplane or a helicopter. However, the type of this particular component or the position of this particular component with respect to the rest of the components within a network is not fixed or constrained in any way and can be different for different applications of the Autoband system. In the following description, the inventors give various kinds of network configurations based on this particular feature about the Autoband components present in a moving object. An accompanying real-world application exemplifying each associated configuration is further provided; however, each configuration is merely provided in order to portray a few exemplary types of configurations associated with common real-world applications and thus in no way is meant to place any constraints upon the range of possibilities.

1. The Client Processor is in a Moving Object and not Connected Directly

In this example, a client processor is seeking information via the Internet but it is not connected directly to the terrestrial network since it is located in a moving object. This example could be very simple up to the point of gateway servers near the moving object. For example, the server and then the router(s) need not know that the client is part of a moving object as long as the router(s) can find a gateway server near the client server. The difference between this situation and a normal terrestrial network connection is that the gateway server will keep changing as the client moves away from it. A simple example of this would be: A train rider on Amtrak trying to do web surfing on the train. In this case, the rider's laptop could be connected to the train's Intranet. The train's network connects to the different gateway servers scattered along its path through a wireless transceiver. In such a scenario in which the receiving client is moving relative to its associated gateway server whereby one or more gateway servers may be utilized to reconnect to the clients, or similarly, whereby a portion of the gateway server caching functionality is off-loaded, in part, to nearby routers, (which thus act, in this case, as part of a "distributed gateway"), it is important to pre-fetch in response to present and predicted location information of the moving client. In other words, knowing approximate speeds of data delivery across the link between the fixed node (gateway server) and speed/direction of the mobile client, it is possible to roughly estimate which portions of the transmission will arrive via which temporally adapted physical gateway server to the client during the interval of viable communications. This data can, in turn, be used to determine:

1. Which candidate gateway servers should receive transmission of the file and when;
2. Which portions of the file should be allocated to which server; and
3. Where exact predictions as to transmission speed to the relevant gateway servers and/or the exact location of the client at the forthcoming time interval which will be suitable for transmission cannot be confidently anticipated beyond a certain degree, a certain redundant portion of that file selected at the interval which corresponds to that of the redundant portion of the file to be selected is pre-fetched.

The above example could be further extended to that of an Autoband chain of vehicles moving rapidly along a freeway. In this case, the predictive determination (and thus pre-fetching task along potentially multiple gateways) is perhaps less critical so long as at least a part of the contiguously communicating chain is in communication with a given server (i.e., each vehicle moving out of range may instead be picked up by the next vehicle in the chain and so on) and so long as the connections between the communicating vehicles is reasonably similar to that of the transmission speed to the associated gateway servers located roadside.

Another extensible variation of this network configuration is the case in which the gateway servers themselves are connected via a high speed interconnecting links to each other and oriented in parallel to the mobile Autoband connections (such as in the freeway example). In this case, it may be most prudent to establish a transmission pathway in which each gateway server routes the information on to the next gateway as each vehicle moves out of range such as may be the case with more extensive fiber connectivity as well as free space optical networks.

2. The Client Processor is Fixed But can Only Make Wireless Connections

The client processor could be in a location where either it is not possible for it to connect to a gateway server or efficient communications with a gateway server is not possible. In such a case, the client processor could establish contacts with intermediary devices that could be located on moving vehicles and these devices, in turn, connected to the terrestrial network via a wireless transceiver. If the client processor connects directly to the nearest gateway server, which may be present on a wireless transceiver which, in turn, could be a part of the terrestrial network and hence connected to other servers through routers, this case would not count as a part of the Autoband system. An example for the Autoband system could consist of an email user holding his PDA who is trying to use it near a road which has consistent traffic. In this case, a wireless transceiver, which is connected to the server through a terrestrial network, can send the required email information to a device in a passing car, which in turn can pass it on to the next car forming a chain and finally the car which is closest to the user can transmit the data to the PDA user.

3. The Server or its Agent is on a Moving Object

In some cases, it is required that the source of the data not be fixed in one location but be on a moving object such as a car or a helicopter. In such cases, the infra structure built for the Autoband system will be very useful. If the source of the data is moving, then it can transmit the data to a fixed processor directly or via a number of intermediary devices that are part of the Autoband system and comprise storage and means for retransmitting the data to fixed servers. A practical example would be: A TV cameraman, who is following a bike race, is taking live video of the race but is not connected to the telecast and the webcast transmitter. The Autoband system will be very useful in this situation as the live video could be transmitted to a chain of TV station owned vehicles equipped with the Autoband devices, and then this chain of vehicles could transmit the live video to the server at the TV studio. Another similar usage would be the telecast and the webcast of the traffic situation being recorded by TV news choppers from up in the air.

Instantaneous Location of the Gateway Servers

The challenge in the Autoband system is to find a gateway server nearest to the present router. The difficulty arises due to the fact that the router may be present on a fixed position within a terrestrial network but it needs to find another gateway server that needs to be present on a moving vehicle in order to make a more efficient path for the passage of the data to the client processor that is not connected directly or indirectly. In certain cases, the gateway server may be connected to the router through a terrestrial network but it needs to make a connection to a secondary gateway server on a moving vehicle.

In order to make an efficient Autoband system, it is advantageous to have prior information on the instantaneous locations of its components. The most common and constantly changing components could be the vehicles containing communication devices to be used in the formation of an instantaneous network providing a communication channel. Information such as routes traveled, dates, times, speeds, distances traveled and the parking times, locations, including day as well as overnight parking information by day, week, month etc. all constitute potentially useful information which can be leveraged for making anticipatory predictions as to physically where each given constituent mobile device will be located both on a short term dynamic basis as well as for the longer term. Other information gathered from other means such as GPS, Lojack, EZ pass toll booth scanner, and license plate scanners would complement the knowledge of the location of the vehicles. In some instances, the information about the location of a vehicle could be gathered from the information about its driver such as phone and e-mail communications with location based key words, on-board navigational direction system inputs from the driver, triangulation through tracking relative signal strengths from two or more cellular base stations during movement of the driver, use of credit cards, ATM, public phone transactions or online maps.

In one approach, the location of individuals and their associated mobile devices must further be identifiable to all of the other devices. Most importantly, the destination node, if it is mobile, must be immediately identifiable in terms of its present location to the sender node and preferably any associated mobile intermediate routing nodes. Location based information and the predictive statistics which it produces about a given user can be useful for such purpose.

The Autoband system has many more variables available to it than are available to the traditional terrestrial networks. These additional network variables in the Autoband system can undergo a statistical analysis so as to make the Autoband system extremely efficient compared to conventional wireless networks. Data mining along with manually ascribed rules with learning capabilities may be used to interpret the complex relationships of the various dynamically changing rules. Data mining also provides the much needed predictive intelligence, for example, to locate the best vehicle to carry on the transmission from a fixed gateway server in terrestrial networks to a user not connected to the gateway server. A few simple examples of such variable may include (but are not limited to):

1. Where the user presently is located;
2. Where the user is predicted to be at any given time (t) relative to each associated fixed gateway server;
3. The predicted sustainable bandwidth of the connection (e.g., based upon average distance between the relatively moving nodes, conditions of the free space traversed by the link, such as weather, obstacles, etc.);
4. The anticipated length of the transmission, etc.;
5. Network cost assessment and transmission routing decision functions;
6. Given sufficient caching capability, throughout the course of the transmission pathway, the lowest bandwidth link in the transmission pathway;
7. Given sufficient caching capability, throughout the course of the transmission pathway, the average bandwidth throughout the transmission pathway;
8. If continuous bandwidth in the transmission pathway is less than the demand for transmission in real time, the average ratio of transmission size to bandwidth across the transmission pathway where the above constraint holds true;
9. If continuous bandwidth in the transmission pathway is less than the demand for transmission in real time, the average ratio of transmission size to bandwidth on the slowest link where the above constraint holds true;
10. If continuous bandwidth in the transmission pathway is less than the demand for transmission in real time, and cache memory capacity is less than the difference there between, the average ratio of transmission size to bandwidth across the transmission pathway where the above constraint holds true;
11. The total predicted quantitative amount of network resources which will be expended and/or compromised (e.g., via signal interference) as a direct result of the communication through the transmission pathway;
12. The total predicted quantitative amount of network resources which will be used up and/or compromised (e.g., as a result of signal interference) as a result of the communications on the transmission pathway;
13. The total predicted overall degree of efficiency, which is likely to be achieved relative to the present transmission;

14. The total predicted overall degree of efficiency, which is likely to be achieved as a result of utilizing the present transmission pathway relative to the network as a whole;
15. Selected transmission modality as pre-existing or potentially available for viable establishment of a link;
16. Transmission range (power utilization);
17. Conditions of the intervening links (as well as external conditions which could affect them);
18. Frequency band utilization and information regarding all other devices which may possibly be in the vicinity of an Autoband device (as collected from other wireless networks); and
19. Memory utilization and availability for both web serving, application processing, caching and store and forwarding.

Any available predictive data regarding the above variables is handled in a processing mode. Such data may include overall statistical probability of acceptable fidelity for the transmission or overall probability of retransmission to be required in light of quality constraints.

Other characteristics of the vehicles include its probabilistic confidence of dynamic, near-term behavior to determine the location and speed of all of the vehicles. Because Autoband represents an opportunistically based high-efficiency communications scheme that is designed for optimization in terms of the economic utilization of its network's available resources, there are, as a result, a variety of condition-based variables that must be simultaneously considered in any economic based algorithm to determining the most efficient communications pathway needed to optimize the utilization of these various network resources, particularly in light of the inherent constraints of the transmission which must be adhered to. For example, some of these constraints could include, but in no way are limited to: speed of delivery, bandwidth utilization, quality of the transmission, memory required (e.g., for any given node and/or all nodes on average), remaining non-utilized bandwidth or memory associated with the transmission, length of the transmission, total amount of bandwidth utilized throughout the course of transmission, the average bandwidth utilization during the course of the transmission, quantity of competing resource utilization, anticipated latency effects sustained on a given transmission pathway, anticipated degree of message loss occurring on the pathway, effective availability of collateral or multi-path connection opportunities likely to be associated with the present pathway, probability of interference by the present communication pathway to another communications pathway given a sufficiently large accommodating cache buffer at the node, the predicted speed of transmission to one router in the transmission pathway given a sufficiently large accommodating cache buffer at the node, the predicted speed of transmission to a second router in the transmission pathway given a sufficiently large accommodating cache buffer at the node, the predicted speed of transmission to the destination, etc.

For each of the above variables, one may additionally consider the probability of improvement or degradation throughout the course of transmission as a result of physical location changes of one or more of the mobile nodes acting as a bottleneck to the pathway. Obviously, a much smaller subset of the list provided is likely to represent the relevant variables, thus effectively correlating with the predicted resource utilization efficiency of a given pathway. For any given link in a transmission pathway, it is of critical importance to optimize the potential availability of bandwidth in addition to using this optimal bandwidth value as an input to the optimal transmission pathway selection process. In particular, remote detection of the type of transmission medium that can be most effectively utilized for a given transmission link may be determined using techniques disclosed in co-pending U.S. patent application Ser. No. 10/205,182 entitled "Mobile Link Selection Method for Establishing Highly Efficient Communications Between Mobile Devices" which is herein incorporated by reference.

As noted above, another important component of the system used in determining the most optimal potential transmission pathway for a given transmission demand is the incorporation of an economic scheme for determining this particular optimization. There are a plethora of techniques that could be applied to this problem and no one in particular is explicitly preferred. However, for purposes of enablement of the present invention, one may, for example, apply a multivariable market model. As indicated above, typically only a significantly smaller subset of the total potential variables may be actually useful and relevant in the determination of market importance in achieving the particular objective(s) for utilization of network resources. One such model is disclosed in the University of Pennsylvania PhD thesis by Harvard Professor David C. Parkes, entitled "Iterative Combinatorial Auctions: Achieving Economic and Computational Efficiency." David C. Parkes. Doctoral Dissertation, Computer and Information Science, University of Pennsylvania, May 2001. This publication is incorporated by reference as simply one exemplary methodology for performing the desired market-based economic functions for preferentially and selectively available and competing network resources. Additionally, this methodology is further useful in terms of its consideration towards efficient and prudent reduction of multi-dimensional features in order to achieve a more efficient and practically implementable predictive data model, while at the same time retaining all of the relevant features necessary for accurately representing the economic dynamics of the market as a whole.

Integration of Autoband with the Terrestrial Network

The transmission capacity across an Autoband enabled wireless network is substantial; it is, thus important in certain application uses of the system (such as Autoband clients as information sources) to provide nodes which tie into a pre-existing high speed terrestrial network such as two-way cable or fiber optic cable network. The following disclosure provides a protocol for topologically changeable network morphology and for the associated locations of its wireless nodes to be utilized like that of a standard fixed node terrestrial network. If the transitional nodes of the Autoband network to the terrestrial network could be physically situated close to one another, some of the considerable uncertainty regarding availability and sustainability of multiple link connector pathways could be substantially reduced. The risk of sustainability of such multiple link connector pathways increases exponentially in proportion to the number of the intervening nodes. It may be possible to embed the nodes, which are located near the "root" or "trunk" portion of the Autoband network. Each of these nodes would in turn, be associated with a transceiver unit, which links into the Autoband network using wireless spectrum for its link. Due to the high demand for multiple links emanating from each transceiver, it is important to enable the transceiver to be able to establish links with multiple devices appropriate to the associated demand for local wireless connections into the Autoband network in the proximity of that particular transceiver. The wireless transceiver could be based on non-line-of-sight RF spectrum. In another variation, an associated transceiver could be used for purposes of delivering multi-modal transmission links including microwave, RF, IR and/or IR laser. An external power source to power the transceiver will be required.

Thus, in this latter regard, the terminal device associated with each vehicle on the Autoband system can effectively act in a multiplicity of functional capabilities, which include:

1. Client device (for sending, receiving or retrieving messages).
2. A network server which effectively acts as a peer device from which remote retrievals by other devices may be accessed, based upon a frequently updated, widely distributed directory on each peer (see technical architecture for the Gnutella system); more preferably, this distributed directory may be individually assigned to reside on a peer dedicated for each regional locality of peers.
3. Given sufficient memory storage capacity, the device in its use as a network server may be configured to function as a cache server as well. As further described below, because of the rather large increases in future anticipated client storage capacity for Autoband mobile nodes, Autoband mobile nodes rely heavily upon this storage for caching wherever it may be advantageous between the origination server and target destination node inasmuch as abundant storage capacity along the entire mobile network can be leveraged to compensate for the rather ad hoc and frequently interrupted nature of the Autoband transmission links. Predictive caching and dynamic pre-fetching should also be leveraged in an opportunistic fashion wherever appropriate connectivity can be established to leverage this intelligence.
4. A router on the IP network, based on commonly used frame-relay and store-and-forward network protocols contains forwarding and routing logic in order to direct transmissions across the network between the sender and receiver either or both of which may be another vehicle or a stationary server. For similar reasons that caching and pre-caching are very important functional capabilities of the Autoband system, similarly active transmissions routed across the network are also subject to interruption or speed reduction (e.g., resulting from mandatory switching to lower band links at times which are unpredictable). Thus, as part of any of Autoband's high speed transmission links, the store and forwarding function of its routers are also largely dependent on ample memory capacity to buffer the sometimes unpredictable incongruities in the network topology's transmission capacity across its various links. In this way, the wireless network that embodies Autoband may act as a contiguous extension of the terrestrial network, in which both networks inter-operate in the transmission, forwarding and routing of data seamlessly and transparently. A technique to make the transmission characteristics of the network topology homogenous and less prone to these dynamically occurring functional incongruities resulting from deficiencies in transmission capacity will be explained further below. In the preferred system implementation, the routers on the Autoband side of the network utilize a link selector intelligence, which collects and processes comprehensive data regarding numerous variables relating to the status of the network, at the level of each individual node in order to create a comprehensive network-wide routing and link selection strategy across the network which occurs in a dynamically updated real-time basis.

As is well-known to one skilled in the art, there are existing and evolving technologies that are based upon programmable and learning rules (or other learning techniques such as neural nets), which form the basis of the so-called "intelligent networks". Such techniques also provide reporting capabilities to network administrators. Nugents developed by Computer Associates is an example of one system, which in this case is based upon neural network technology.

It is anticipated that learning rules typically ascribed by humans via data mining analysis and refined and updated through feedback resulting from implementation, could be applied for a variety of purposes for use within Autoband including:

1. Providing adaptive embedded intelligence for general network traffic routing and management purposes.
2. Developing an intelligently adaptive and efficient strategy for managing caching and pre-caching decisions both long-term and dynamic (in the case of pre-caching) in light of historical statistical probabilistic modeling of conditions (factors) that are conducive or non-conducive to enabling access by a node to desired cached stored locally regionally proximally or non-locally to that node under these particular conditions. Although the caching functionality connotes potentially longer-term memory storage than transient DRAM-based store-and-forward nodes, this functionality could nonetheless be viewed as a direct extension of the store and forward routing logic when taken within the context of a multi-node distributed router intelligence.
3. Developing an adaptive strategy for pre-loading and maintaining applications and functional application components as in the case of distributed processing (as detailed below).

In contrast to the set of variables used in standard network implementations, typically neural nets are not used for dealing with more complex high dimensional attribute spaces common to Autoband, nor as part of rule-based systems due to the difficulty in mining data patterns which are non-linear in nature. In addition, neural nets typically face the problem of a user interpreting such non-linear patterns for purposes of effective rule construction. This is further compounded by the fact that the network level router intelligence provided within the Autoband system, however, requires the use of many more variables than that of traditional terrestrial networks. (In addition to those suggested above, others are further detailed below.) In general, statistical data regarding typical network operations are best analyzed using traditional descriptive statistical data mining techniques while rules may be refined by statistical algorithms of a predictive type which include non-linear methods among other types (which are indeed preferable to neural nets, because of the inherent complexities of the resulting multi-factorial nature of the data models). Non-linear kernel regression techniques are one such non-linear approach. Preferably, a standard predictive model would be used by a human analyst to extrapolate the fundamental statistical relationships among each of the various variables to one another. Then the key correlated variables could be analyzed using a non-linear kernel regression model or a similar method in order to extrapolate the more subtle complexities of these attribute's statistical correlations. It cannot be overemphasized that in order for non-linear relationships to be statistically detectable, sufficient data must be available and this factor is much truer if non-linear relationships are to be observable if/when such relationships exist among multiple attributes.

Thus, statistical techniques that provide for the incorporation of data mining in combination with the ability to provide manually ascribed rules with learning capabilities are important for providing dynamic updating and refinement of those rules for the Autoband system in order to properly interpret the various multi-factorial complex relationships of these various dynamically changing variables and to ultimately properly leverage the much needed predictive intelligence using human mediation to prescribe the appropriate rules to compensate for the dynamic multivariate correlations, which make the Autoband system such a challenging problem in achieving reasonably persistent homogenous network topology and transmission characteristics. In accordance with the emerging IP protocol "Active Networks" much of this "higher-level" intelligence could even further be embedded within and as a more sophisticated extension of the basic forwarding and routing logic and thus run as a distributed process on the devices of the wireless network.

The description below further explains how this active network protocol with the capacity to program network routers could further be used to leverage unused processing capacity and associated memory of these vehicles (which in one, and the most important application) are used for the processing objective for use as a network router with unique mobile characteristics.

Bottom Level Autoband Description—Applications and Novel Uses of the Present System Framework Applying Techniques of Caching and Anticipatory Pre-Caching to Autoband In future memory enhanced network implementations, there will also be valuable benefits achievable through the integration of powerful caching and predictive caching technology adapted to Autoband's wireless network topology and dynamic mobile terminal characteristics. In fact, Autoband's underlying technology that enables efficient traffic routing that is facilitated by the closely interrelated need for effective caching are overall two of the most important advances achieved through Autoband. These challenges are primarily addressed through Autoband's ability to establish dynamic links with characteristics which are completely adaptive and able to fully exploit any/all wireless link opportunities dynamically and in ad hoc fashion and to exploit these fluid connect pathway configurations in a way that emulates the persistently homogeneous connection pathway characteristics of a standard terrestrial network. In this regard, the following specifications are herein incorporated by reference: U.S. Pat. No. 5,754,939 entitled "System for the Automatic Generation of User Profiles for a System for Customized Electronic Identification of Desirable Objects" as well as its continuation-in-part co-pending U.S. patent application entitled "Broadcast Data Distribution System with Asymmetric Uplink/Downlink Bandwidths" and co-pending U.S. patent application Ser. No. 10/369,057 entitled "Location Enhanced Information Delivery System." These associated disclosures describe techniques for the design of a network architecture that is capable of predictive caching using statistics-based predictions based upon the behavior patterns of user's past page requests. These system architectures further synergistically combine the use of predictive caching with personalized delivery of that data to match the user's preferences, particularly in the present bandwidth and memory constrained state of wireless terminals. Localized pre-caching as well as user presentation of this personally relevant information is in a general sense an extremely important capability in wireless systems in general. Co-pending U.S. patent application Ser. No. 10/693,149 entitled "Secure Data Interchange" further suggests ideas for technical methods by which it is possible to anticipate where individuals are predictively likely to be physically located at any given time (short-term or potentially long-term) based upon their past behavioral patterns and other inputs such as present behavior, present and past correspondences and information queries and requests. Co-pending U.S. patent application Ser. No. 10/369,057 entitled "Location Enhanced Information Delivery System" and "A System for Collecting, Analyzing, and Transmitting Information Relevant to Transportation Networks", further provide a potential technical means for anticipating future location of vehicles by providing a data collection platform regarding user's physical behavior with a statistical analysis module which, if applied to Autoband, could be readily adapted to also predict on a short term, or even to some degree a long term basis, physical location of a user for a user's vehicle based upon analysis and timing of past behavior. Accurate dynamic (short-term) vehicle or device locations prediction is, of course, the most valuable capability in that it provides a means for anticipation probabilistically vehicular proximities in a temporal context as well as likely sustainability of such links thus enabling Autoband network wide opportune data routing pathways and their associated most opportune link modality selection options.

In the unlikely event that adequate data sources about real-time vehicle information is not presently available, other attributes are useful in predicting present user location. Other uses of predictively anticipating vehicle (or device) location in more of an advanced context is advantageous from a caching standpoint, i.e., in order to pre-send data to the device which is location-specific prior to arrival to avoid the imminent likelihood of real-time retrievals or pre-fetches. It may have the added benefit of also conveniencing the user through better and more expeditiously accessible personalized information access and in additional user data from caches which were previously accessed or of predicted interest can be present to the server in close proximity to the user's new (or anticipated new) physical location or to the user's client device. Finally, longer term anticipation of user location can even provide a means by which files which need to be sent (in non-dynamic fashion) to a different physical location can be "physically" transported via mobile nodes (e.g., just before leaving for work a user's updated work related files could be physically transported by being pre-loaded onto his/her vehicle's memory storage or the same could occur just prior to leaving for vacation.

Predictive Pre-Caching

In addition it is anticipated that in most implementations of Autoband, due to the short distance peer-to-peer link design of the architecture, the bandwidths will tend to be less asymmetric than most wireless networks, which are non-Autoband enabled. Nonetheless there is still significant advantages from the standpoint of bandwidth conservation using a type of dynamic caching technique called demand aggregation which is applied for multicasting and predictive loading of data streams over asymmetric bandwidth net works. Accordingly, it can be provided (particularly at the links within the more asymmetric portions of the networks using Autoband) by integrating its associated techniques as described in co-pending U.S. patent application Ser. No. 09/842,477 entitled "Method of Combining Shared Buffers of Continuous Digital Media Data with Media Delivery Scheduling" which is also herein incorporated by reference.

The ability to perform file transmissions in a more multicast fashion regardless of the particular methodology used accordingly conserves bandwidth.

It is also further important to incorporate in the design of the present system a multi-node sequential hierarchical design in which the novel multi-cast techniques are integrated at each link between each node in the sequence of nodes constituting the present transmission pathway. Either demand aggregation or standard multicasting may be used in this regard (e.g., pre-caching of a file which is new and determined relevant for certain geographically located users)

delivered during a relatively low bandwidth utilization period. That is also to say that because in Autoband, the characteristics of the transmission (e.g., power/range and frequency) are fluid, dynamic, and ad hoc, it is often advantageous to send via the above technique relatively long distance transmissions on a file by file basis, whenever that file can be predictively sent to multiple terminals in the Autoband system that are likely to imminently request it in the very short term. Issued U.S. Pat. No. 5,754,939 entitled "System for Generation of User Profiles for a System for Customized Electronic Identification of Desirable Objects" and pending U.S. patent application Ser. No. 09/842,477 entitled "Method of Combining Shared Buffers of Continuous Digital Media Data with Media Delivery Scheduling" disclose methodology for dynamically predictively anticipating user requests for purposes of performing dynamic anticipatory pre-caching of those files locally before actual request.

It is worthy to note that in the event, as presently suggested, that a long distance transmission carrying a message or a file from an Autoband device such as a vehicle, the frequency of these longer range significantly high power RF transmissions typically do not interfere with that of "typical" Autoband links connecting local devices with their respective associated directly neighboring devices even if the frequency directly overlaps in as much as the relative strength of the local transmission signal constituting the local link usually effectively "drowns-out" the transmission signal of the longer range transmissions. In the event that some interference occurs, e.g., the other long-range signal is too strong or it is too close, could notify the sender of the short-range link and the transmission strength of that link could be increased. Of course, these "long distance" transmissions could be potentially any distance range exceeding that of the very shortest albeit "typical" Autoband transmission signal, i.e., a single neighboring peer-to-peer transmission range. The range of transmission, i.e., signal strength is accordingly modified dynamically to adapt to the distance of the furthest recipient terminal of that particular multi-cast.

Accordingly, it is also important, particularly in these relatively short long distance transmissions, to anticipate prior to transmission if there may be interference which cannot be avoided through increasing power of the (potentially interfered) local link(s). If so, a determination must be made as to whether the value of the multi-cast outweighs the total amount of bandwidth consumed on all affected neighboring peer to peer links (or shorter distance Autoband links) relative to the available bandwidth on the links collectively. It is also important to consider probabilistically via the distributed link selection intelligence, the relative urgency of other messages delayed as a result of the interference. In this regard, because bandwidth on each of the associated links is a key variable assuming bandwidth on each link averages out to about the same, the number of interfered links roughly speaking should be equal to or less than the number of messages being multicast at any given time.

User behavior prediction on a temporal level both in terms of information consumption predictions as well as (most importantly and relevantly to Autoband) user location prediction as a function of time could be useful for a number of purposes within Autoband, which include:

1. Input to the link selector (an extension of the intelligence module of the router described in detail above) for purposes of selecting links in order to help optimize the efficiency of link connections including associated routing decisions on nodes which are functional routers on the transmission pathway where the router intelligence and its associated link selection decisions must utilize predictive data regarding all vehicles and/or devices in proximity of the device. Store and forward decisions utilizing this predictive model are also part of the functional role of this router intelligence.
2. Caching and pre-caching decisions both long-term and short-term. In addition, input from the router intelligence is used for these pre-caching decisions (particularly importantly for short-term pre-caching) where real-time and very short-term predictions of real-time link utilization of available bandwidth between the potential source(s) and desired destination(s) for the transmitted files are essential input data to the pre-caching intelligence on the target (destination) server(s). Likewise, the pre-caching intelligences should also appropriately disclose its delivery strategy to the router intelligence as well for optimizing routing strategy.
3. Network level distributed processing of applications—primarily based upon long-term but also to some degree short-term predictive loading of application components (as detailed above).

Use of Dynamic Location Detection of Other Automobiles for Determining Link Selection As suggested, an important aspect of the Autoband architecture is determining the most opportune link to select at any given moment in time. There may, of course, be opportunities at any given instant to establish a link with more than one, perhaps multiple, other mobile nodes and it is in fact a challenge to determine which one, or ones, are most likely to provide conditions which establish the most favorable communications link under the constantly changing present conditions. As suggested, it is extremely important to achieve such attributes as good throughput, message loss minimization, cost minimization of the link, current traffic minimization on the link, etc.

The use of these criteria previous to making a particular selection are programmable and thus a number of different approaches may be used as part of the link selection intelligence. In the case of multiple chain links or a single link, the intelligence for selections is based upon a variety of different criteria. Nonetheless, rules may be created through semi-automated or alternatively automated approaches (semi-automated refers to the use of data mining techniques to allow a human expert to manually construct rules). These rules, in turn, may be refined and updated automatically through the further use and implementation of the system. In the first two cases, automated learning techniques may be applied. In addition there may be numerous other external factors, which may affect the relative importance of each of these various criteria.

In the most practical application of Autoband, there are often ad hoc opportunities on a very frequent albeit relatively persistent basis which are often predictable on a very short-term basis exclusively. In this way, in order to establish a high-speed connection to a desired data source, these ad hoc opportunities are often predictable, however, on a very short-term basis exclusively. These data sources may include:

1. A remote server;
2. Memory cache in another automobile that is presently more conveniently located than a remote server containing that information; and
3. All or part of that file in the process of being transmitted from one automobile's DRAM or disk drive to another automobile.

The distributed link selector intelligence (DLSI) must be adaptive with regards to not only predicting the optimal routing path and link selection based on present and predicted device locations across the network and integrating this data with network objective such as traffic and congestion management control functions, but also ultimately in extending these link-specific objectives beyond the individual link level to that of a master strategy for the entire network. This inevitably also requires an adaptive learning system for monitoring and controlling (and in some cases prioritizing trade-offs for) these variables so as to be able to achieve optimality for pre-defined network performance criteria prioritization and integrating and implementation of various strategic network objectives variables in addition to its principal role as a data transmission network system with caching capabilities. In addition to simple message transmission, the overall network functions may incorporate:

1. A network-level processing architecture (using programmable routers and active network architectures); and
2. A network backbone (i.e., a "wireless" backbone) when/where extra bandwidth exists.

Thus, an even greater challenge is presented to the distributed link selector intelligence (DLSI) to establish an overall prioritization of network objectives in light of available present and future predictive network resources such as available memory bandwidth and their locations, and from this data to develop a routing strategy, link selection strategy (typically shorter term) as well as dynamically modify one or more of these interrelated co-existing strategies dynamically and in mid-stream if resource availability and/or prioritization of the objectives change in mid stream.

Within the afore-mentioned U.S. patent application entitled "A System for Collecting, Analyzing and Transmitting Information Relevant to Transportation Networks," there are other technical ideas applicable to Autoband which are also described including enabling communication between heterologous databases and networks. Such teachings are herein incorporated by reference.

Traditional P2P wireless networks are designed with seven different frequencies of which often only one is able to be used for any given transmission. This is because assuming each peer is in a fixed location if we wish to be able for each peer to transmit to and from any or all peer devices at the same time to potentially all of its neighboring peers, the peers are arranged geometrically in a hexagonal pattern (with one peer in the center of each hexagon) totaling 7 peers for each geometric component unit constituting the overall pattern. This is because in order for a transmission link to be established between any two neighboring peers, the frequency band of that (non-directional) mini-cell will necessarily have to overlap with each of six other cells. For designing the locations and frequency allocation for fixed LANs in a P2P network, this hexagonal configuration for a single component unit is accordingly the smallest number of micro-cells simultaneously overlapping on any given fixed device. Thus, seven different non-overlapping frequency ranges within the radio frequency spectrum in this case would be the minimum number achievable while also guaranteeing connectivity between any peer and any of it neighboring peers throughout the overall fixed pattern of wireless LANs. However, in the Autoband system framework, it is possible to reduce this minimum number of different frequencies by much more dynamically and intelligently selecting chain link pathways. For example, Autoband's persistent location detection of each device, frequency allocation and power (range) control as well as frequency modulation to a more directionally specific targetable sub-microwave range enables an average reduction of these number of high frequency band micro-cells by intelligently and predictively achieving optimal minimization of such overlapping bandwidths. The transmission requires high bandwidth, which if Autoband works well and reasonably consistently, this will typically be the case.

One of the key objectives is to ultimately achieve the highest overall bandwidth for that wireless transmission. Because these chain link pathways are created entirely in ad hoc fashion (established and discontinued) opportunistically (even if necessary) during the midst of a message transmission and because on the average, at any given time, the vast majority of devices are not being utilized for their own individual purpose of transmission or reception, these devices are often liberated for use in the Autoband system when the need arises. There exists in most cases tremendous flexibility of Autoband to establish links, often in a sequential chain formation, wherever the link needs to be established wherein from one point to another in the physical space of the desired wireless transmission the minimum amount of interference (spectrum-wise) is ultimately achieved over any one of the component chain link connections in that particular chain. The one caveat to this objective is that the transmission does not have to be delivered in real-time. Assuming there exists adequate memory at the devices preceding a bandwidth "bottleneck," and if such relative bottleneck does not compromise speed above a certain acceptability threshold or the link selector intelligence identifies that the present compromise is of overall advantage to the Autoband transmission strategy as a whole, there may be other higher priorities for the devices constituting this link chain, which Autoband may preferentially utilize for other transmissions and/or links.

Nevertheless, typically achievement of the most favorable efficient conditions for a link will involve preferentially favoring establishment of a link over another potential link where:

1. There is a minimal amount of existing (or predicted) spectrum which pre-exists within the physical space occupied by the range of the transmitting or receiving node of that link.
2. The number of other nodes within typical transmission range of the sending or receiving node is small (and Autoband's predictive model suggests a reduced probability of the utilization of one or more of those other proximal nodes) and the bandwidth utilization transmission by those other proximal other nodes would tend to be small if utilized (again as determined probabilistically).
3. The distance of transmission is relatively small between the two nodes thus conserving power, which is particularly useful if the power supply of the device is limited as in portable devices.

As such, this link selection procedure is based upon:

1. The present bandwidth needs for each link (e.g., file size in combination with urgency of transmission) as well as, based upon present and predicted location of each peer, the predicted availability of bandwidth to match the need for that transmission for the duration of the transmission depending upon the device. Predicted bandwidth availability also is based upon probable opportunities to establish very high speed line of sight connections. For non-line-of-sight connections, transmission distance, of course, can be increased for a potential link by increasing the power of transmission. Of course, this also increases the likelihood that there will be an interference of the frequency with another wireless link or interference with a potentially viable best chain selection which would otherwise occur.
2. The existence of present or predicted interference between one or more other links. Frequency splitting is one way to avoid interference (at the expense of bandwidth however). It should also be noted that any of Autoband's dynamic and predictive techniques for optimizing efficiency and speed of transmission (including interference avoidance) uses dynamic re-routing to another data source and/or retransmission nodes (i.e., chain link pathway), frequency splitting, change to different transmission modality, etc., which can occur dynamically in mid-stream of a transmission.

3. The number of nodes of a multi-node multi-link transmission, which are traversed for the transmission more specifically, the overall latency associated by the link selection.

Of course, these variables are contributing input variables to the system's integrated intelligence, which considers all of the variables for all links constituting a potential transmission pathway. Then such potential transmission pathway in combination with the variable of time or delay for each of these associated potential links determines a network level transmission strategy which optimizes the transmission objectives of all messages in light of the priority associated with each of them collectively at the network level overall.

Details of Distributed Link Selector Intelligence (DSLI) in Establishing Multi-Link Chains Multi-Link Chains In many instances, Autoband may determine that the most efficient high-speed connection to the desired data source will involve links between multiple automobiles in a sequence in which a combination of transmission modalities are deployed depending upon distance, visibility and/or obstacles between the automobiles, etc. The opportune link selection may thus in theory be based upon present and anticipated locations, speeds, and behaviors of each automobile which are indicative of both present and predictive of short term locations and relative positions between vehicles, which constitute a potential sequence of links to the source of that desired information. Predicted vehicle location may be based upon a probabilistic model which considers such features as present location and historical driving patterns, data of that driver or vehicle; other variables include traffic conditions or even driving behavior of other vehicles nearby, as well as traffic signal schedules of nearby forthcoming traffic signals, area and physical characteristics of roadway, weather conditions and time as well as (when available) destination information and also the associated on board navigational system suggestions to the driver also predicting or confirming short term location. In the preferred embodiment, the link selector for each automobile operates such that updates as to the present location of each automobile within reasonable transmission proximity to the present one is transmitted to all vehicles independently in that locality at a minimum, the intervening vehicle between the present one and the original stationary data source or destination of the data presently being transmitted to or from the present vehicle, which is typically closest to the present vehicle. The link selector's intelligence may either be located on a stationary server (e.g., which is assigned the task of the link selection strategy and decisions for all automobiles within a given physical radius) or it may physically reside on certain automobiles which are assigned the link selection task for all automobiles within a given physical radius. If the link selection task is an inordinately complex task even local memory limitations (i.e., no local vehicles possess disc memory capability and there is no readily available stationary server locally), the intelligence could be run as a distributed process. As is explained further below, along with this constantly updated location data for other vehicles, the transmission modality of each link is transmitted (or links in that transmissions link chain), coming to and from each respective vehicle and its associated frequency to achieve the "best" frequency available while being sure to avoid interference as well as, via network level analysis and associated embedded agents, the files and other communications which are being transmitted and likely will be transmitted imminently to and from each vehicle.

In this way, the predictive model must provide an estimate of the locations of both the vehicles in immediate proximity to the present one with which the first link must be selected and established in predictive fashion as well as the likely anticipated locations of other vehicles in each prospective sequential chain of communication links leading from the most opportune source of the desired data for that vehicle. Of course, the "data source" may include the present vehicle in transmission mode wherein the link selector intelligence determines the most opportune route to either the target automobile destination or receiver associated with a gateway providing efficient transmission access to the ultimate destination, which is also selected automatically. This gateway typically is also automatically selected based upon the most transmission "efficient" route at present. From input regarding the above variables regarding vehicle location, their relative position with each other and/or a data source or destination as well as large quantities of historical data corresponding to these variables, it is possible for a statistical model to be generated which considers dynamically predictive changes to the physical location/orientation of relevant network nodes as well as network resource availability/accessibility throughout the course of a given transmission. The present predictive statistical model can predict with reasonable accuracy such variables relating to the intervening communications infrastructure any of a number of different variables including among a variety of others:

1. The link route(s) to the desired data source which is shortest overall.
2. The link route(s) which provides the highest bandwidth availability (i.e., which considers all probabilities of the various physical positions and associated transmission characteristics including the slowest link as a function of time throughout the course of that transmission).
3. The link route(s) which percentage-wise anticipates to be least occupied by other traffic throughout the course of the transmission.
4. The link route(s) which is anticipated to have the least amount of impact on bandwidth either overall or number/degree of those instances in which bandwidth is in demand by other potential links and accordingly the overall negative impact that the link would have in terms of the number of other competing transmissions, the relative amount of bandwidth which is occupied or more particularly rendered unavailable to those other links compared with the link opportunity of the present transmission.
5. The link route(s) which is anticipated to have the least probability of being interrupted during the course of the forthcoming transmission, e.g., by the stationary transceiver or one of the mobile transceivers moving out of range without a viable rerouting alternative, direct interference from another link or the link (or one of the constituent links) being superseded and replaced by another higher priority transmission signal.
6. The link route(s) that is anticipated to be able to maintain the highest degree of sustainability of any combination (or all) of the above desirable criteria.
7. (Related to all preceding variables) The link route(s) that is anticipated to have the least degree of delay. This is also based upon the speed of each link in combination with the memory capacity of the preceding intervening vehicle to be able to cache at least a portion of the transmitted file for all links which cannot be transmitted as quickly as it is received and accordingly, the speed at which that vehicle is likely to transmit that cached data to the next vehicle subsequently during the course of the same transmission.

Of course, numerous other variables may be further included including all of those identified in the previously disclosed list of similar variables geared toward characterizing the potentially available communications links for a given communication need. It is most optimal to automatically measure and report to the link selector intelligence each variable which can, in turn, become the input to the algorithm utilized within the distributed link selector intelligences as well as a data mining reporting system such as could be utilized for enabling human experts to construct or revise adaptive rules determined for the optimized efficiency communications scheme (both of which have been previously alluded to above).

An important design consideration in the architecture for multiple chain links is the modality used to dynamically determine, sort and transmit data regarding the location of each node, its link selection, which type(s) of viable links can it communicate with its memory capacity, etc. and any other relevant information from one node such as a router in the chain link pathway to another. Co-pending U.S. patent application Ser. No. 10/369,057 entitled "Location Enhanced Information Delivery System" suggest viable means for determining node location on a data basis, including GPS and roaming or transmission signal triangulation between two or more nearby cellular transceivers. If a chain link transmission pathway is already pre-existing, of course, all of this data may be freely transmitted to the desired nodes along that pathway. Other potentially relevant nodes containing part of the DLSI may either receive the appropriate data through temporary periodic chain link connections which occur at very low bandwidth utilization or a standard (non-Autoband) wireless message may be communicated to those other nodes in standard fashion. This, for example, is certainly the preferred communication modality if/when links become broken due to external variables such as obstacles, interference and/or distance and an alternate link selection modality or multi-link connection pathway is required for transmission of that signal.

At a more general level and outside of the particular application environment context of the Autoband applications and specific hardware instantiations herein described as the ideally preferred embodiments for the present Autoband conceptual framework, there are some pre-existing high level peer to peer wireless ad hoc network prior art references which describe certain conceptual components which are incorporated as part of the broader suite of the preferred Autoband applications as herein described. These references relate to "ad hoc networks" and are herein incorporated by reference.

Multivariable Market Based Model

As per the above list, it is clear that there are a substantial number of variables which are in some way correlated with others and thus affect achievement of certain desired criteria in the Autoband system. These desired and pre-identified variables are readily reduced to formulae used to solve an optimization problem for that associated criteria (performance objectives of the Autoband system). The system's performance criteria in most cases also involve tradeoffs with other performance related objectives. Because user demand for these objectives are also context specific, i.e., are relative to individual users and the specific context surrounding those users such as specific activity involving the use of Autoband, location, time, contextual variables of the data being sent or received, etc., and because these performance criteria often are conversely associated with tradeoffs with other performance related criteria either relative to one user or group of users with another or relative to that system implementation as a whole, essentially the relative prioritization of each of these unique criteria defining a specific objective of the Autoband system should be determined by a market based approach with the one caveat that due to the nature of or the complexity of the Autoband system there are invariably inherent relationships between more subjective performance criteria and more important fundamental performance related requirements relating to the network's viability. Thus in order for this market model to be a reasonable approach, the effects of not only the individual variables but also the interrelationships of these variables should be clearly defined to the core sample of users, which engage in the market making activity. A PhD thesis describing in detail this relatively novel concept of multi-dimensional multi-variable market model was written by David C. Parkes of the University of Pennsylvania and could be usefully applied to the creation of this particular market model application. Specifically in the context of the present market based system, it is useful to apply statistical algorithms such as clustering techniques to identify the most (perhaps in conjunction with principle components factor analysis) in order to make inferences about the statistical importance (i.e., market demand) of these multi-variable environments which may affect overall market demand based upon the inter-relationship of each of these variables which can vary at an individual level. Of course, these variables may also have practical constraints in their relationship with one another as well, as one or more variables may affect one or more other variables from a purely technical standpoint. Although principal components analysis may simplify to some extent, the complexity of this multi-dimensional market, it may still be difficult to extrapolate these variables based upon simple analysis of the satisfaction or dissatisfaction of user needs based exclusively upon observation. It may be necessary to use, for example, a decision tree to simulate different network environments in which exemplary multi-variable conditions are created in order to test user market demand for these conditions. Multi-variable relationships may also be deduced and further tested through this market approach through the process of experimental design from where a decision tree could be introduced in order to test the relative importance of these inter-related variables overall and under what specific user conditions.

Wendi Heinzleman, professor at MIT also has developed research and technical methodologies for market oriented negotiation based protocols and those specifically implementing such techniques for predicted network costs within the context of network routing for wireless devices and wireless sensors. Current articles of relevance include "Energy-Scalable Algorithms and Protocols for Wireless Microsensor Networks," Proc. International Conference on Acoustics, Speech, and Signal Processing (ICASSP '00), June 2000, W. Rabiner Heinzelman, J. Kulik, and H. Balakrishnan: "Adaptive Protocols for Information Dissemination in Wireless Sensor Networks." Proceedings of the Fifth Annual ACM/IEEE International Conference on Mobile Computing and Networking (MobiCom '99), Seattle, Wash., Aug. 15-20, 1999, pp. 174-185). These articles are herein incorporated by reference.

It should be noted that in order for the present system to function optimally, it is clearly desirable, in fact almost mandatory, to provide a communications framework by which all vehicles are able to utilize the Autoband architecture to communicate with one another regardless of which communications network they belong to. The two primary advantages are to establish optimal chain link pathways and to avoid interference with other communications or Autoband links particularly, which cannot be managed on a predictive anticipatory basis. Thus, Autoband may effectively become a universal communications protocol between potentially any wireless communications network for automobiles (or in variations of Autoband, other types of mobile device based networks which certainly should inter-operate with the standard Autoband networks) as primarily embodied in this specification. This universal protocol is also important for purposes of identifying likely points of interference between any two or more peer to peer chain links which utilize non-line of sight transmission frequencies and thus are subject to potential interference. Because an area of interference greatly limits the amount of bandwidth for both the present link and the other (interfering) link, it is useful to utilize the predictive model to anticipate the probability of any given link in a prospective link chain to be interfered with by another link for non-line-of-sight transmission frequencies occupied by that potential link as part of the basis for selecting the most opportune link chain (this involves predicting both vehicle location and user request and transmission behavior) as well as data about the network's intelligent traffic management (store and forward) strategy for imminently occurring data traffic and general network-level traffic statistics. This common protocol is important for both location tracking in all device based transceivers which could either pose a threat of interference or opportunity to connect through directly or via a chain of most opportunely selected links via the network and device transparent communication protocol.

Furthermore, for any given single transmission it is possible to dynamically and uniquely select a frequency band for each link in the chain link pathway using technologies such as software radio based upon the present and predicted vehicles or other devices constituting other present and anticipated nearby communication links which are predictively likely to overlap with that link in the present chain during the course of that transmission event. If an overlapping frequency will occur which is unanticipated or unavoidable, frequency splitting techniques can be used as well. Of course, automobile communications links are certainly not the only potentially interfering wireless communications. In this way a second function of Autoband's distributed intelligence regarding surrounding and forthcoming anticipated transmissions is intelligently creating and updating a frequency allocation strategy for all links. By the same token during any given period of time, other non-vehicle wireless devices may also exist in proximity to a vehicle which is transmitting or receiving and/or part of a link chain which could be potentially deployed as a node in the chain and/or an optimal source for the desired data or as a gateway to a high-speed communications network (such as fiber-optic) by which the data transmissions are sent and received. Thus, Autoband may and in fact should provide the framework for a universal protocol which enables the persistent interoperability between any and all types of wireless communications networks as well as an associated platform for monitoring and collecting data regarding the location and associated transmission strategy (timing, transmission modality, frequency, duration of transmission and signal strength/distance). This data is, of course, also critical in identifying and predicting points of interference with other wireless communications links occupying the same frequency band and geographic locality both within the traditional Autoband network as well as external to it. In addition to the advantages provided by being able to recruit and thus leverage other external network devices into the Autoband network in an ad hoc fashion, the ability to detect and ideally, whenever possible, receive any "network level intelligence" from any and all of these external wireless networks the transmission range which potentially overlaps with that of any Autoband device is extremely critical in avoiding and whenever possible also predicting these potential points of interference.

In order to provide at all times a critically important "complete picture" of the frequency and the position and strength of all nearby wireless signals, it is by far most ideal if all wireless networks located in any given physical proximity of any and all devices used by Autoband are programmed to inter-operate with Autoband. Even if the network does not wish to inter-operate for purposes of sharing bandwidth and local memory for optimizing transmission efficiency as discussed, the ability to provide Autoband with the above data to detect and anticipate when possible and thus avoid potential sites of interference is very important for the mutual welfare and benefit of both Autoband and the other network.

Extending the Autoband Paradigm to Other Devices

The complete suite of capabilities, and functions, which the Autoband platform enables may be readily extended to almost any other type of wireless device provided adequate local memory is available to perform the essential functions. In the relative mid to long term it is expected that even micro-electronic wireless devices will contain more and more local memory. Because of the falling cost of memory and the resulting forthcoming massive proliferation of wireless devices of all types, this paradigm of creating higher bandwidth wireless connectivity to and between most types of wireless devices within the context of a completely ad hoc networking topology is expected to become increasingly feasible on a wide-spread basis by virtue of the uniquely adaptive intelligence-based networking and transmission characteristics of Autoband as herein described.

At a more fundamental level, the above paradigm of Autoband's unique adaptation of all wireless networks to become the underlying hardware infrastructure for fully enabled networking topology for P2P transmission network level processing is through various progressions of the wireless revolution. In particular, memory increases will be sufficiently large and increasingly low cost that they will significantly impact local processing and storage for many and perhaps most wireless devices. It will thus become possible to effectively utilize local memory buffers and processing capabilities on other standard wireless devices as well as automobiles with substantially all of the functional capabilities of Autoband.

If this provision is made, it is, of course, possible using the present architectural framework to design an Autoband system framework which in certain regional portions of the P2P network consists predominantly of other types of wireless devices such as cell phones, fixed wireless LANs in addition to vehicles or a combination of any (or typically all) of the above.

Use of DLSI to Provide an Adaptive Routing Strategy

In light of the fact that it is possible to centrally collect and store information on a dynamic basis about other nearby wireless transmission signals, the locations and effective availability to harness devices on other networks even outside of the standard domain of Autoband, the DLSI must dynamically optimize performance efficiency for the desired associated functional objectives as pre-defined for the network as a whole. It is thus important for the link selector to identify and act upon opportunities for establishing links which are very dynamic, ad hoc and very adaptable, dynamically changeable and adaptable for seamless formation and transitioning of links from one node connection pathway or data source to another. In this way the link selector may also very dynamically revert to various other transmission modalities even during the course of a given node to node transmission. For example, there are many types of dynamically changeable conditions affecting a given chain link pathway as well as any of its associated links in which this type of distributed intelligence used to dynamically affect these types of adaptive changes are required. Consider the following examples:

1. A vehicle in the chain link pathway has moved out of range for communication via an infrared link, thus it selects microwave or cellular.
2. The vehicle has very little accompanying traffic tracking its current trajectory; however, other vehicles in the opposite direction traffic are close enough to one another over a long enough physical distance that it is possible to enable a chain link pathway to be established with opposite directional traffic, i.e., the vehicles forming this chain link pathway are close enough together over along enough distance that it is possible to establish this pathway while the associated constituent vehicles are constantly changing due to the opposite directionality of the traffic to the message.
3. Local LANs or even local stationary devices with their own high bandwidth capacity may dynamically move in and out of range to the vehicle and thus provide ad hoc opportunities to link or re-establish links with the present vehicle or if the existing desired link is in place it may introduce a higher bandwidth linking opportunity. This ad hoc opportunity may, of course, be temporary, however with the proliferation of wireless technology enabled devices, other LANs, devices and vehicles in a densely occupied area may provide a relatively sufficient degree of persistence of the connection.

This capability constitutes the other application of the protocol for programmable routers utilizing unused memory capacity and processing power (particularly in the future generation devices) for purposes of high power distributed processing of applications which occurs in a rather ad hoc fashion and thus requires a substantial amount of additional bandwidth in order to dynamically migrate applications seamlessly across the network which Autoband attempts to address. This paradigm will become increasing feasible as local memory capacity continues to improve, thus eventually there will also be the ability to leverage the available processing and memory, capacity (i.e., extra capacity) as unused processing capacity which is available during the frequent and often extensive periods of non-use or low use of most devices by their users.

This is another example of the particular importance of the ability to leverage rather large storage capacity resources throughout the various wireless mobile nodes comprising the Autoband's side of the network. This also is to suggest that because the reliability of the Autoband side of the network as it is deployed in this context for high speed distributed processing use could in addition be viewed as a valuable processing resource for providing additional (or perhaps ancillary) processing capacity to the basic distribution of processing architecture which resides principally on the terrestrial (non-Autoband) side of the network. Co-pending U.S. patent application entitled "Multiple Independent Color Architecture" (MICA) provides some unique efficiency enhancing dynamic processing design capabilities which is applied in the context of the MICA specification to distribute optical processing exclusively. However, Autoband with its dynamically mobile and changing network level processing architecture could, perhaps, usefully leverage certain aspects of the adaptive learning capabilities of MICA. In particular, one of MICA's unique features is the fact that widely distributed intelligence inherently exists regarding the basic processing components, i.e., task routines and sub-routines which constitute the basic functional characteristics of the various applications running across a (potentially very large scale) network. To the extent that the MICA protocol is able to leverage detailed knowledge about the fundamental functional design of each of all of these network level applications, it is possible to perform a certain amount of "aggregation" of processing tasks which are functionally similar across these various application at least to the extent to which certain economies of scale can be achieved through a collective rather than independent processing strategy for those particular processing tasks. Because of the rather ad hoc and unpredictable nature of transmission links across all nodes in Autoband, the most efficient way to optimally leverage these distributed processing resources is prioritizing this approach to processing tasks which are associated with those types of application whose processing requirements are somewhat temporally adaptable and thus much less time sensitive than others. Barring this caveat, alternatively there may be additional techniques which could provide some additional leverage for more dynamic processing requirements. For example, there are definite trends toward establishing software design protocols by which in theory all software could become modularized into common building blocks consisting of a specifically definable, finite, functional units. Accordingly, to the extent that these functional components or at least the most frequently used and/or memory conserving key components could be pre-stored on most large capacity storage equipped nodes on Autoband, much of the existing application specific functionality (i.e., associated with most application) could, in theory, be run on a rather ad hoc and dynamic basis with minimal unique functional down-load requirements on a dynamic ad hoc network such as Autoband. MICA also provides the predictive intelligence, based on historical statistical data of previous processing requirements to preferentially prioritize the local selection of certain functional components on each node to optimize the locality of the ultimate processing requirements associated with where their applications are most needed. Accordingly, it may even be possible in the specific application to Autoband to regionally pre-load certain functional components to select nodes which are regionally representative of other nodes associated with that locality such that more dynamic ad hoc distribution from that regional node to local surrounding nodes can be readily achieved in a rather short-term basis associated with relatively immediate applications specific processing demands. This, however, is in no way to suggest that in many (perhaps most) instances, Autoband's Dynamic Link Selector Intelligence (DLSI) system is not more than capable of spontaneously developing a processing strategy for an application level processing requirement as it occurs and accordingly pre-load the appropriate functional components to the appropriate distributed processing nodes well in advance of the actual processing need for the associated desired application. The remaining instances for dynamically requested application processing needs are either substantially pervasive enough to be highly predictable in nature or represent a relative minority of the large scale processing tasks if they occur on a quite independent basis.

It may perhaps also be useful to perform this component pre-loading based not upon the presently needed applications-specific tasks per se but rather the applications specific tasks which are probabilistically most likely to be needed both presently and subsequently.

Even though advances in transmission signal capacity within existing wireless spectrum as well as compression technology advances are continuing to make substantial improvements in wireless bandwidth, Autoband's primary breakthrough is a much more significant increase in bandwidth to mobile wireless terminals. The increasing prevalence of wireless devices which are sufficiently memory equipped to act as Autoband routers will certainly have a further marked effect on this improvement, and it is likely that there will still inherently be increases in memory substantially exceeding the increases in wireless bandwidth achieved through mass proliferation of Autoband devices. Accordingly for this reason, the importance of the role of this increasing local memory storage for wireless terminals in association with the mass proliferation of devices within future generation wireless networks of all kinds cannot be overemphasized particularly in its key role as an enabling component of each of the various above described functional roles providing not only network-level processing but also much more fundamentally the essential elements required for a complete network topology.

There are a variety of exemplary situations in which the specific implementational details of distributed processing are worthy to note. The basic idea behind distributed application processing at the client level is that memory and device numbers will continue to expand dramatically compared with the relative increase in usage. This enables client-level processing to be usable as a shared resource for other devices. The shared resource could either exist on a single relatively powerful client or a combination of devices running a distributed application.

A few exemplary situations include the following:

1. Distributed processing of applications run across multiple vehicles. In this example, it would be reasonable for the various vehicles which pace the present vehicle to and ideally are determined per their destination to follow the same route at least throughout the course of the period the application is predicted to be used. The same concept could conceivably be extended and applied to personal digital devices carried by pedestrians. An application in accordance with its processing organization can typically be organized for processing purposes in a hierarchical tree fashion with the functional components at the top of the tree representing common functionality which is integral to other components of the application of common functional abstractions to the application. In generating a geographic topology for this application processing strategy, the idea is to construct a two dimensional representation of the function hierarchy of components. For example, the top hierarchical components will be located at the most centrally situation location with respect to the other processing nodes.
2. Combining processing from stationary server with mobile vehicles or devices. Because it is quite likely (particularly more so in the future) that sufficiently large amounts of local memory and associated processing resources will reside on very proximally situated nearby stationary clients and servers via road-side home LANs, it is possible that on the associated extra space, it may be possible to pre-cache additional copies of applications or portions thereof for purposes of providing a shared processing resource to those vehicles and other devices which are most highly predicted to both have a need for the use of that application in a reasonably short-term temporal time frame. Alternatively, a pre-cached version of the application for download when the vehicle is in direct proximity in which the estimated preferred location of the pre-cached copy is also synchronized in accordance also with the predicted temporal timing of the user's need for that application as well as (if the desired copy is on a mobile node) the predicted location of that vehicle (or all other vehicles deployed to carry out that desired application-specific processing task strategy) to the user's vehicle at the time that the application is fully likely to be needed. The application in this way could utilize the notion of the physical mobility of vehicles and mobile devices themselves as an alternative "transmission medium."

In one version, in order to conserve local memory resources or to off-load more of the processing burden to the mobile devices (vehicles) and/or to increase available processing power in total, it may be possible to provide the present distributed architecture by using multiple parallel tracking vehicles in combination with the present concept using also local fixed location devices. As is suggested, the system is intended to dynamically determine, locate and accordingly update the location of applications at the physical locations when they will (predictively) be needed. Nonetheless, given the unpredictable nature of vehicles (and devices), dynamic migrating of these applications will be inevitably quite necessary, although a mitigating factor is that very "popular" applications could be more liberally pre-cached according to the predictive usage model, which is much the same as the above-mentioned file pre-caching technique whose specification is incorporated by reference. In addition, file pre-caching techniques for mobile devices are covered in co-pending U.S. patent application Ser. No. 10/369,057 entitled "Location Enhanced Information Delivery System." Fortunately, the high bandwidth connectivity, which is on average reasonably persistent in nature, is able to effectively perform these dynamic migrations of the appropriate application files. It is also often able to effectively establish a communications link from an existing location of the cached application for remotely interfacing with that application. It thus becomes another probabilistic determination as to whether it is most efficient (primarily from a bandwidth perspective but also perhaps from a memory and processing resource perspective) to migrate the application file from the remote site to a more local site, to the vehicle (or device) or simply remotely interface with the application remotely. An additional part of the decision is based upon how well the predictive use model is able to perform. Another, is how much bandwidth availability exists prior to its anticipated need. Yet another is the reusability factor of the application (or the associated functional components) as well as task processing aggregation opportunities (with other applications), which is described in MICA. In consideration of these latter two considerations, once a general probabilistic need distribution model (mapping) by location is determined, it is possible to locally cluster functional components for applications based upon both the anticipated need for the application by the associated local proximity degree of similarity in the number (relative size) of these functional components.

These portions (functional component) of the application which are not common to other applications of probable local relevance (likely the minority) and/or these remotely situated processing aggregation opportunities exist in which could be situated remotely during the processing routine.

Decisions must also be made regarding the users' anticipated degree of use of that application and whether it is likely to be more bandwidth efficient to pre-send the application and, if so, which portions are prudent to send based upon bandwidth consumption of the pre-send versus operating certain portions remotely during use (this is based in part upon predictions of degree of ultimate use), whether/how much reuse of each functional component could be effectively used for other applications as well as how much (if any) processing conserving aggregated processing of the functional components with other simultaneously operated tasks could be effectively achieved.

The complete suite of capabilities, and functions, which the Autoband platform enables may be readily extended to almost any other type of wireless device provided adequate local memory is available to perform the essential functions. In the relative mid to long term, it is expected that even micro-electronic wireless devices will contain more and more local memory. Because of the falling cost of memory and the resulting forthcoming massive proliferation of wireless devices of all types, this paradigm of creating higher bandwidth wireless connectivity to (and between) most types of wireless devices within the context of a completely ad hoc networking topology is expected to become increasingly feasible on a wide-spread basis by virtue of the uniquely adaptive intelligence-based networking and transmission characteristics of Autoband as herein described.

At a more fundamental level, the above paradigm of Autoband's unique adaptation of all wireless networks to become the underlying hardware infrastructure for fully enabled networking topology for P2P transmission network level processing is through various progressions of the wireless revolution. In particular, memory increases will be sufficiently large and increasingly low cost that they will significantly impact local processing and storage for many perhaps most wireless devices. It will thus become possible to effectively utilize local memory buffers and processing capabilities on other standard wireless devices as well as automobiles with substantially all of the functional capabilities of Autoband.

Again, all of the data regarding the surrounding bandwidth and memory utilization device location, data traffic, transmission modalities used and particularly present and predicted application usage demand for that application across the network, etc., as well as all predictive models relevant thereto are essential for the present predictive model in determining the most efficient data transmission and application distribution model.

Distributed Processing and Predictive Pre-Processing

Absent very good user location prediction techniques, predicting dynamic movement dictated by the user's (or vehicle's) present and past movements makes it quite challenging to perform any sort of distributed processing (which may include predictive processing) of applications using the high-speed nature of the Autoband links. Pending U.S. patent application entitled "Multiple Independent Color Architecture (MICA)" suggests a statistical approach, which is based upon this predictive processing idea. It would be apparent to one skilled in the art by reading MICA of how to build a highly adaptive dynamically changeable pre-processing architecture which occurs on demand and as needed (by specific location) to the extent that substantially very large memory resources exist at the device terminal level. In particular, it is ideal if available memory is sufficient to liberally cache applications in a reasonably close proximity to where they will be used if even a reasonably low probability exists that the location necessary for operating that application in present proximity to the neighboring peers containing other portions of the distributed application will be achieved (or sustained if it is already running presently). Because of the very dynamic and ad hoc nature of the overall system, considerable consideration must be made towards weighing the statistical confidence in anticipating the physical location of the mobile user. For example, the less mobile the user actually is the better in this regard. Also, mobile caches add an additional exponentially greater level of certainty in this regard. With regards to the ad hoc distributed processing scheme in a preferred embodiment, the network designs user packet's switching based upon frame relay techniques. For purposes of anticipating applications or smaller application components it is possible in certain cases to anticipate (using past statistics) both to anticipate the user need for certain applications, anticipated location of their associated users and the anticipated location of devices in proximity of anticipated locations of those users for purposes of predictively caching the application or allocated component(s) thereof in anticipation of the location of the need and additional processing requirements. Alternatively, the application may be cached to the associated devices to performing distributed processing particularly if the applications (or components) are somewhat more difficult to predict, are relatively small in terms of the amount of code (relative to the anticipated speed/bandwidth availability for purposes of transferring that data) and/or the opportunity exists to cache redundantly relevant components (or even applications) as a result of available additional local memory resources relative to the code size. The emerging Internet protocol for "active networks" is applied in this situation. As such the references at the end of this disclosure under the same title are herein incorporated by reference. Depending upon the sensitivity of data associated with the applications, one reasonable approach would be to monitor centrally portions of an application which contains sensitive information while off to add to the distributed environment (as presently suggested) those portions are suited to distributed processing which lack some of the centrally informational or functional components which are privacy sensitive.

Example Cases

An example of the case of wireless LANs could include the case of the wireless landscape of the future. For example, smart homes of the future have been talked about for several years. It has been predicted that each individual household will have its own independent dedicated high-speed LAN (e.g., connected via high-speed cable to the home) which will enable not only wireless connectivity between literally almost any appliance but also enable high-speed voice/video within a wireless environment anywhere within the home LAN. For example, it is very probable that during the next decade the wireless landscape will be such that most homes will have high speed connectivity with associated high speed LANs and most vehicles will be equipped for reception, transmission and retransmission routing of high speed signals. Additionally, there will be a prevalence of a variety of portable wireless devices (cell phones, PDAs, digital cameras, wearable computers, etc.). Potentially all of these types of wireless nodes could be tied into the Autoband network with receiving, transmission and retransmission capability in accordance with the universal communication protocol suggested above. In this environment, it certainly would be reasonable for the high-speed home LAN to extend, say, as far as the nearest road or street. Depending upon the dynamically generated connectivity strategy by Autoband's internal intelligence, it would be possible in ad hoc fashion to selectively extend the range of each home LAN which is in closest proximity at any given instant to a passing vehicle. In theory, the extended range LAN of a particular home could revert to its normal range once the vehicle passed into an area which is within the reach of the extended LAN for the present home as well as that of its forthcoming neighbor. At this point the extended LAN of the first home could switch off simultaneously to the next home's extended LAN switching on, thus assuring a persistent high-speed connection to the vehicle (in this case the end node) at all times. Of course, if the street or roadway has considerable traffic such that a high-speed line-of-sight chain link pathway is achieved, only one of the vehicles at any one time would require this high-speed connection to a local home LAN. One caveat is that Autoband's internal intelligence will attempt to make use of potential high-speed links, which are underutilized at that moment while avoiding those which are currently substantially utilized. For example, in the above system instantiation, if the forthcoming home LAN is substantially utilized, the high-speed connection could be maintained or more feasibly, by a high-speed line-of-sight or broad spectrum RF connection which could be established with another vehicle on that roadway which in turn could link to the home LAN within its closest proximity and retransmit the signal as a router to the original vehicle (the destination) in order to assure its high speed connection. If the vehicles on the street, for example, are all within the extended range of home LANs, but all unfortunately are being utilized (although some spare bandwidth exists on one or the other end of the street), it may be possible to create a chain link pathway via the present vehicles to that LAN using, e.g., lines-of-sight or RF provided it does not interfere with the signal of the intervening LANs being utilized.

As described further below, there may also be a scenario in which Autoband via its chain link pathway is actually able to instead deliver additional bandwidth to not only portable devices but also stationary nodes such as a home LAN (e.g., by establishing a high-speed chain link pathway to a local distribution node servicing that home or even a node on the backbone or even in one novel scenario via a contiguous chain link pathway with one which embodies a backbone consisting of an Autoband high-speed chain link pathway using infrared laser based links. In the future, as suggested, it is also very plausible that prevalence of portable pedestrian toted devices will also provide similar opportunities to retransmit high-speed signals to vehicles as an intermediate node, or possibly chain of nodes, between a high speed LAN and the vehicle or vice versa.

This premise is based, however, largely upon the assumption that there will be a great prevalence of these devices everywhere. However, because of the potential for both even higher bandwidth connections via line-of-sight transmission modalities and higher local memory resources for caching, it is anticipated that the most prevalent scenario will be high-speed chain link pathways between primarily, automobiles which, in turn, deliver data to portable electronic devices either through direct links or possibly a smaller chain of high-speed links consisting of very localized portable electronic devices, immediately prior to the one which is the receiving device.

Nonetheless, in general, from a statistical standpoint, most of the bandwidth associated with the LANs at most homes at any given time will tend to be either underutilized or not utilized thus making the present approach quite viable under most conditions. Again, these linked pathways would be largely opportunistic and established ad hoc whenever the opportunity is identified to fill a particular need and whenever the transmission source and, if needed, retransmission nodes are presently unutilized at the moment. By the same token, in accordance with the Autoband paradigm, it is equally plausible that the most efficient high-speed data source either for a portable device or a static LAN is accessible via an automobile as a retransmission node or even a data source of the desired target data which happens to be stored in its memory.

As is described further below, in addition to transceivers on the vehicles, the transceivers associated with local stationary nodes may also be adapted to high-speed line-of-sight links with vehicles using microwave or infrared laser in addition to radio frequency to the extent that desired target files are stored on these stationary nodes (e.g., associated with a home LAN). These nodes could also behave within the present implementation scheme of Autoband also effectively as an Autoband node (e.g., for caching, peer web serving, routing) by which links are established with local vehicles, portable electronic devices or directly with other local stationary nodes.

In addition, the use of these non-RF very high speed transmission modalities between vehicles and vehicles to local nodes further increases the effective available bandwidth for very localized wireless links for locally portable devices or devices used within a present local LAN environment exclusively.

Because of the potentially very high speed data transmission capacity of Autoband, when the conditions are ideal (i.e., line of sight), high speed microwave or infrared connections constitute all of the links in the chain link pathway connecting the data source to its destination, it is possible whenever there is a demand for high speed transmission capacity for Autoband not only to provide a high speed connection to an automobile with a data source originating from a nearby high speed LAN but also if this capacity of a present potential sequence of chain links situated between a high speed data source (e.g., at a regional data distribution server or a node on the fiber backbone) and the stationary LAN exceeds the capacity of that of the pre-existing network connection to the LAN, and assuming that the associated bandwidth cost requirements across that chain link pathway at present are, economically speaking, worth the marginal gain, it is reasonable to provide this chain link pathway to route this additional capacity bypassing the existing terrestrial network. In fact, it is possible if desirable for the local LAN to be able to receive bandwidth by possessing an IR receiver such as an IR laser and ideally microwave receiver as a secondary high-speed line-of-sight link modality which could feasibly be simply a pre-existing satellite receiver by which passing vehicles and even aircraft or airborne nodes could deliver high-speed data via high-speed chain link transmission pathways established in order to reach that particular target stationary end node.

Decisions of whether or not to establish such a chain link involves a more complex relationship of variables such as would the apparent resulting additional marginal increase in capacity be important enough to off-load the bandwidth consumption costs from the links across the various intervening nodes (again, as with all of these decisions a multi-variable market model is utilized to weigh on a continual constant basis the economic benefits to the network constituents of each plausible alternative connectivity strategy).

Passing aircraft are another architecture for providing additional link and associated bandwidth improvement opportunities to the Autoband system as heretofore described. It also provides another novel and independent type of system instantiation which fits into the basic novel architectural framework of Autoband. The links may consist of either a single connection (say) between an automobile to an aircraft which happens to be passing overhead at the moment of transmission or reception and another line-of-sight link from the aircraft to a gateway server which is a node on a high-speed terrestrial network or if such a gateway is not in line-of-sight or too far from the aircraft, it may establish intermediate links with other aircraft and/or even actual vehicles which, in turn, are directly or indirectly accessible to such a gateway via the traditional methods provided by Autoband as presently described. Typically, these line of sight links consist of microwave communications or if the atmospheric conditions are conducive, an infrared link may be established using a relatively high power yet safe transmission signal which may be focused using laser technology. One commercially deployed system at the time this disclosure was written which is relatively low cost is called "Canobeam" and is used for broadcast and data transmission as well as bridging discontinuous fiber-optic transmission cables. Its transmission range is up to 4 Km. In addition to aircraft to ground or vehicle communications, such a system, if incorporated into Autoband standard, includes vehicle—vehicle or vehicle—stationary transceiver architecture. The cost factor associated with ubiquitous deployment actually constitutes the preferred link selection modality (i.e., whenever line-of-sight is feasible) for a number of reasons which including bandwidth capacity which are herein further explained. In addition to the increasing bandwidths capability of Autoband by standard vehicle to vehicle links, it may be possible to replace one or more of the links in one of the standard Autoband chains with a link to an aircraft or even establish a new transmission pathway thus bypassing or eliminating multiple vehicular links in the high-speed chain link pathway thus eliminating unnecessary re-transmission nodes to benefit latency for transmission or distributed processing. It also, in theory, enables the establishment of other parallel IR laser links between those other intervening vehicles. In this regard it may even be used in this way as a means for increasing overall capacity.

In these bandwidth enhancing implementations, it may even supplement bandwidth capacity along a high speed fiber-optic backbone.

Because aircraft are much sparser (geographically speaking) at any one time in combination with the fact that they typically travel at a high rate of speed, they move in and out of direct line of sight quickly from any one vehicle. This persistence of direct line-of-sight is further interrupted by the vehicle's movement, as well. For these reasons (as well as the geographic sparseness of aircraft) aircraft to vehicular links may frequently rely upon a combination of transmission modalities, which may be dynamically interchangeable even during the course of a single given link. Of course, if line of sight is presently feasible or at least is presently available and is anticipated to remain so for the near term, a link consisting of the highest bandwidth IR laser is the preferred modality of choice. If this is not achievable a microwave link is the second preferred transmission modality of choice. If/when direct line of sight is no longer available typically it becomes subject to undesired continual interruptions from obstacles such as trees particularly if/when the angle of the link becomes more oblique. These interruptions can to some extent become anticipatable vis-a-vis historical statistics because of the relative distance factor with most aircraft (5,000-15,000 ft. altitude), and it is likely that the efficiency of transmission and importantly minimizing the interference effects resulting from encroachment upon other Autoband links is best achieved by switching the link to that with another terrestrial terminal. This decision must be also balanced against the complexity of multi-node connections. If on the other hand, maintaining or re-establishing a ground to air connection is determined to be preferable, instead of switching completely to standard RF which is likely to occupy a relatively large broadband mini-cell, the link with the aircraft or with another aircraft if persistence and quality of the link is anticipated to be better may switch to a frequency band which lies between radio and microwave thus providing a moderately high degree of bandwidth (though not as much as microwave) with the advantage of not requiring direct line-of-sight while at the same time reducing the risk of interference as the directionality reduces the cell size surrounding the transmission in the two horizontal coordinates which are, of course, in this case perpendicular to the direction of transmission and are also the coordinates which are relevant to any potential interference from other RF cells whether ground to air or most pre-dominantly ground to ground. The directionality of the transmission signal would also tend to avoid interference from other similar ground to air links as a result of the relative sparseness of overhead aircraft and as a result of the tendency for significantly different angles to be utilized in different ground to air connections utilizing this band which is also high speed, directional in nature, but not entirely dependent upon direct line-of sight also avoids interference from these similar types of "intermediate band" connections, which may occur between two or more terrestrial devices in addition to the ground vehicle in ground to air connections. This approach also enables a certain degree of directional "tracking" of the target aircraft.

Of course, such non-terrestrial networks would also be ideal for direct access by the aircraft and its passengers to high-speed data. As with the other embodiments of Autoband, all other variables being equal, it is preferable to select and utilize the highest bandwidth communication modality which is infrared laser technology or secondarily, microwave, and both of which are dependent on a line-of-sight link. If direct line-of-sight with the target device or intermediate node is not achievable, as an alternative option, another (typically more multi-link) pathway (e.g., vehicle to vehicle or vehicle to LAN).

An IR link is the preferred transmission modality of choice or microwave may be used as a secondary transmission modality for line of sigh if the distance exceeds the range for IR laser. If/when direct line-of-sight is no longer available, either the link with the aircraft or with another aircraft if persistence and quality of the link is anticipated to be better may switch to a frequency band which lies between radio and microwave thus providing a moderately high degree of bandwidth (though not as much as microwave) with the advantage of not requiring direct line-of-sight while at the same time almost certainly avoiding the risk of interference in as much as the directionality of the transmission signal would tend to avoid interference from other similar ground to air links as a result of the relative sparseness of overhead aircraft. It may be possible to utilize a band which is also high speed, directional in nature, but not entirely dependent upon direct line-of-sight. This directionality aspect avoids interference from these similar types of "intermediate band" connections, which may occur between two or more terrestrial devices including possibly the ground vehicle in the ground to air connection due to the significantly different angle in ground to air connections.

The Role of High Power Infrared Laser Technology in Autoband

At a general level, the focused infrared laser technology suggest above is actually a very powerful technology for generally addressing many of the effectively inherent weaknesses of Autoband. This includes optimizing speed of links, significantly increasing persistence of links at a very high transmission capacity level as well as establishing viable links to aircraft either as an intermediate link (between router nodes) or to an edge node (either a vehicle or stationary client). However, the introduction of this link modality as framed within the present disclosure is provided as only one of several preferred alternative transmission modalities in as much as in conjunction with its substantial potential benefits for use within Autoband there are also substantial implementational issues to be dealt with as well, for example, the relatively high cost of implementation and importantly the obvious issue of implementing on a fairly ubiquitous scale (e.g., associated with all vehicles). Also, traffic from both the backbone and leaf-end must co-exist on the same links. Particularly for backbone traffic persistence of the links is a very important characteristic. For example, while the technology does offer transmission capacities which are equivalent to that of fiber optic, the cost of installation is also quite substantial more so than non-focused Infrared links.

There is a very high capacity and a somewhat reduced risk of interference for non-focused infrared links (e.g., infrared under the grill) compared to microwave. The non-focused signal is, however, prone to diffusion and thus weakens and diffuses rapidly beyond a very short distance (e.g., several automobile lengths).

As suggested, one of the significant benefits of the IR laser technology is, by contrast, the ability to persistently maintain high-speed links at the capacity of the optical range as well as establish new links even if the target device in line-of-sight is far away and/or out of direct positional alignment with the present vehicle as the laser cannon's direction ability is precisely controllable and because the beam is very narrow focused and quite powerful but safe to humans and for this reason IR laser is most ideal compared to microwave for those links which are used to off-load bandwidth loads of existing networks above the leaf end of that network as is explained further below and in one instantiation of this application. Also, traffic from both the backbone and leaf-end may even co-exist on the same links. Particularly for backbone traffic persistence of the links is a very important characteristic. In fact, a caveat regarding the overall Autoband system architecture in general is that due to the very dynamically mobile nature of Autoband connections, of all types the often common occurrence of potentially "critical" connection points in its chain link pathways for which viable alternatives are infeasible (or quite impractical), and because of the high-speed data transmission requirements, but for the cost factor (which is relative), the IR laser technology addresses these important requirements in a very compelling and befitting manner. This is due to its ability to achieve links at significant distances and (importantly) achieve them with a high degree of sustainability and secondly, provide extremely high bandwidth connections.

One of the distinct advantages of the IR laser technology to Autoband is its ability to maintain such a high transmission capacity for substantial distances (in theory up to 4 km). This bandwidth capacity would not be achievable within the microwave frequency spectrum. Because the beam is not nearly as focused, in the case of microwave there is likely also a higher degree of interference from other vehicles also transmitting in the same direction along the same stretch of roadway requiring "frequency splitting" in order to compensate. Although this problem could be somewhat compensated for by using very weak signals for the links, due to the relatively high energy nature of microwaves, there is nonetheless no sound means to avoid the risk of short range interference from the nearby vehicle transmissions while maintaining integrity of the signal unless this bandwidth reducing frequency splitting technique is used. Nevertheless, because of the reasonably high bandwidth capacity of microwave, if/when the IR laser link between two points is interrupted, short of entirely re-routing the connection there may be other ways of adapting to the interruption by switching to a lower frequency link such as microwave and or switching to radio spectrum which, of course, can be non-line-of-sight. RF is ideal for areas/times of low vehicular traffic but otherwise is impractical at any significantly broad spectrum range because of the local interference issues with other RF links. In this scenario, because the bandwidth capacity at lower frequencies is inherently smaller, one technique is to dynamically re-route the connection pathway via another parallel chain link circumventing the interruption which may have to be a parallel chain link pathway or one consisting of multiple parallel chain links or (as is described below) "borrow" bandwidth capacity from another terrestrial-based network throughout the course of that breached portion of the chain link pathway.

The primary drawback associated with IR laser technology is the cost of the basic technology, particularly in light of the issue of mandatory mass deployment for ubiquitous availability. Part of this cost is based upon the extremely dynamically movement oriented nature of the Autoband links. Such a narrowly focused beam must thus be dynamically re-directable at the point of transmission with very fine precision to maintain a stable and consistent lock on its target receiver. In order for the longer-range reliable line-of-sight connections to be made and for such a powerful beam to not interfere with other similar nearby infrared links, this positional readjustment must be both very precise in two dimensions and four degrees of freedom and be able to dynamically occur in real time. In the case of momentary misalignments resulting in an interruption of the beams current protocols are able to effectively address these issues (e.g., wireless satellite DBS IP transmission protocols for managing packet loss). In the case of the examples cited above, if the stationary node transceiver at the end of the Autoband chain link pathway is associated with a LAN, typically the intervening link whether a vehicle to stationary node, vehicle to vehicle, stationary node to stationary node, aircraft to vehicle or aircraft to stationary node is providing connectivity to a high speed data source such as a fiber-optic network node while if the end node is associated with a vehicle or portable device, typically the intervening links are providing a connection to a high-speed data source which could be either a fiber-optic network node or (if none is available) a LAN with its own reasonably high-speed data source (i.e. relatively speaking) such as cable modem, ADSL or satellite. In the example case of aircraft, because the bandwidths enhancing opportunity is substantial and because of the geographic sparseness (and very short intervals in which line-of-sight links could be established for any continuous period), typically the aircraft has precise directional control capability over the given signal transmission, however, unlike the ground transmitters which it connects to the aircraft has multiple of these directionally controllable transmitters and thus it is able to perform signal relay and routing functions for multiple simultaneous Autoband transmission signals. As is consistent with the Autoband architecture these links may likely serve a multiplicity of applications and comprise a multiplicity of functional roles within a network system context. In the case that a given chain link uses the aircraft in the functional role as a forwarding node such as a router, the DLSI in its control over the routing strategy in the special case of aircraft, unlike its other implementations within Autoband must also consider additional complicating variables inherently associated with these ground to air links, such as employing the rather complex statistical model based on historical data regarding the predicted sustainability of a link based upon both the vehicle's and aircraft's present locations, trajectories and speeds, the viability and sustainability of these likely alternative link modalities if the present one fails and in addition to the standard considerations of comparative efficiency, speed of transmission (compared to the speed requirements of the file) and available network sources, its relative bandwidth requirements, comparative costs of overall network resources and many others. In addition, the line of sight link must of course be much more dynamically and precisely controlled (for each of the multiplicity of links transferring the routed data).

If the vehicle is both microwave and infrared laser technology enabled, it may be particularly useful from a cost efficiency standpoint to mount both transmitters on the positional control device such that microwave transmissions may also be somewhat directionally controlled (e.g., so as to avoid interference from similar transmissions from on-coming traffic or other nearby vehicles). In this application, typically small private aircraft travel at, or above, altitudes of 4 km (the range limit of IR laser). Thus, unlike smaller aircraft, large commercial aircraft will typically be limited to microwave transmissions. Even for these small aircraft flying within the 4 km altitude limit, the distance limitation could be easily surpassed as the angle of transmission becomes more oblique to the ground. In addition, weather factors such as humidity, temperature, precipitation and clouds may further limit the maximum of 4 km transmission distance for purposes of practical implementation, thus it is advantageous for these aircraft to be able to dynamically switch between microwave (albeit at a lower transmission capacity) and IR laser for any of its links as needed.

Other Uses of High Power Infrared Laser Technology

As suggested, there are compelling advantages of this concept to Autoband. Despite the extremely dynamically adaptive characteristics of the Autoband system, as well as the fact that in and of itself the IR laser technology offers considerable desirable enhancements to the present Autoband system, there would still nonetheless be additional advantageous enhancements worthy of implementation whenever/wherever feasible which may be able to further enhance the availability and persistence of IR laser links from any given location and time. A few examples presently considered include:

1. IR signal relay devices mounted at "high visibility" locations and preferentially located in strategic fashion at those sites which tend otherwise to be prone to interruptions at critical points in the chain link pathways and/or during high demand times based upon historical statistical data, e.g., due to increased RF or microwave interference. Examples include telephone poles, light poles, buildings, radio towers, hill tops, etc. Highway intersections (e.g. mounted on top of traffic signals) are also ideal strategic locations inasmuch as a stationary relay which is able to receive and transmit in all four directions from the intersection enables consistent chain link pathways to follow traffic routes along crossroads. In a very simplistic implementation, a relay device could be as simple as an IR lens whose angular position across any axis in two dimensions is dynamically re-adjustable such that the retransmitted laser beam can target any vehicle or stationary receiver along that stretch of roadway. Interruptions of the beam via moving vehicles is, however, a significant issue for remotely originating laser beams thus the role of such technique is perhaps better suited in a facilitative capacity. However, it may be possible to use the patterns of interruption from previous vehicles and other associated point-to-point links in relation with certain exact physical locations in order to anticipate when/where connectivity and interruptions are going to likely occur given the speed trajectory and/or planned travel route. With this precise anticipatory model it is possible for the DLSI to make spontaneous proactive routing decisions in order to optimize the overall desired network objectives. For example, it is possible immediately before an anticipated sequence of brief interruptions at a key link along the backbone for the DLSI to make a strategic decision to re-route only "high" priority data (e.g., live media, IP telephony conversations, etc.) through the Autoband store and forward based chain link pathway. If the interruption is expected to be complete and longer, it may be most efficacious to the overall system objectives to completely re-route additional (or all) data of lesser priority as was previously slated for transmission along the original pathway.
2. Establishing short distance links with existing high speed data transmission infrastructures. For example, as indicated above, it may be useful to install along fiber-optic transmission cables, which track the course of a roadway, intermittent nodes which are able to interchangeably convert between optical and radio frequency and vice versa in order to thus utilize a very broad spectrum RF mini-cell for transmission and reception links between the backbone and on an Autoband chain link pathway. In another approach these backbone nodes may directly convert the optical signal to either IR, IR laser and/or microwave which are typically (particularly for IR laser) dynamically re-directable such that the link may be consistently maintained with the target vehicle for as long as possible. The basic idea in this concept of establishing this parallel IR laser based virtual backbone to that which is carried via the optical fiber is that if the intervening intermittent nodes are located frequently enough, parallel and within proximity of a parallel Autoband backbone, one can effectively "free up" enough bandwidth of the optical fiber based backbone that one can utilize this extra bandwidth for the duration of that particular segment to effectively redirect a portion of the Autoband backbone traffic which reaches the "bottle neck" at a point of one of its links being unachievable or interrupted. It is also possible that because this resulting high traffic segment of the optical fiber is very short, that its bandwidth capacity will actually be significantly larger for that segment than the overall effective bandwidth throughout its course. An additional caveat is that bandwidth capacity relative to its demand is considerably greater at the core level of the backbone. By virtue of the present application by which the higher capacity Autoband system (using IR laser) is physically extended out to a much more localized distribution level, the network's bandwidth issues are effectively addressed by this present idea of opportunistically off loading bandwidth loads particularly throughout these more peripheral leaf end segments in the existing network out to the leaf edges of the network which tend to be more bandwidth constrained and overloaded. Even though the ability to establish Autoband links (particularly near these edges) tend to be somewhat ad hoc, collectively, the edges of the network (forwards to its "leaf nodes") is where the largest relative gains are achieved by Autoband in light of the much more limited bandwidth capacity of the existing copper or cable transmission infrastructures. It is thus possible near these leaf edges to use very high speed, broad spectrum but very low power RF signals to connect to this local cable or copper infrastructure. This may be achieved either by leveraging the existing local wireless LANs (e.g., home LANs) even preexisting satellite antennas and/or via intermittent wireless nodes built into the transmission lines themselves. Or alternatively (in either case) the associated network nodes may use specially constructed for this purpose IR, IR laser and/or microwave transceivers in order to establish direct high-speed links to the chain link pathway. Described further below is a fairly elaborate technology for providing very high bandwidth. The system uses IR laser technology to establish links between vehicle(s) and stationary transceiver. In this regard, it is theoretically possible that the available access to bandwidth achievable via the passing vehicles is actually higher or certainly very high and much more underutilized. Thus, it may be advantageous in certain cases to utilize the high-speed capacity available via the vehicle links to deliver additional bandwidth to the local stationary end nodes (home or office LANs or even very local portable devices). In a similar fashion, in a very viable scenario, there may be local distribution nodes which service a regional community, e.g., 500 homes or a single real estate subdivision which is likely to be in close proximity to major highways and roadways in which consistent delivery of high capacity bandwidth is quite feasible by Autoband. Also, regardless of where the bandwidth can be feasibly delivered to stationary nodes, one distinct advantage of this present approach is that considerable bandwidth associated with the pre-existing asymmetric bandwidth communication infrastructure may be effectively freed up by off-loading request queues for delivery to individual network links as described further below. The end result is significantly greater overall bandwidth to the edge nodes on the communication network and wherever the need arises by virtue of this net savings in bandwidth, enabling an environment whereby it is feasible to even further apply this additional bandwidth on the pre-existing telecommunication network wherever it may be resultingly under-utilized to further transfer this additional capacity to the Autoband system at these particular physical points in Autoband where there is a need but inability to establish (or maintain a critical link) within one or more of its high speed chain link pathways. This transfer point would be a means by which the available capacity in the telecommunication network would become a "bridge" for Autoband's chain link pathway and the bandwidth would, at the other end of the breach, be transformed back to an Autoband node unless it was utilized by an end node(s) on the telecommunication network itself. In this way, in order to deliver relatively high capacity bandwidth, either from Autoband to the telecommunications network, or vice versa, in a convenient, extremely ad hoc fashion at almost any point within the network where it may interface with Autoband opportunistically in this way, it is desirable that the link modalities between the stationary transceiver and Autoband is not limited to RF (e.g., via each individual LAN), rather that it include transceivers (at a minimum receivers) for IR laser and/or microwave. In so providing the platform for this these other ad hoc high bandwidth link modalities (another vehicle-vehicle or vehicle-stationary server) the available bandwidth for the surrounding RF micro-cell (e.g. for the local LAN or other nearby devices) is substantially freed up. This is true potentially that for other local networks such as RF cellular, satellite, DBS, ADSL and/or cable for which Autoband is able to effectively off-load capacity to its associated edge nodes. In the event that a line of sight link (microwave or IR laser) becomes breached, wireless RF is the preferred second option. Thus to the extent that local RF bandwidth can be freed up for use in such cases it is a substantial advantage (e.g., by using vehicles and local LANs to provide connectivity to those devices via "mini-cells" or by using IR or microwave when feasible for any connections between vehicles and a stationary node).

"Reversible Router" Architecture

Although it is not mandatory, in the above situations it may be possible to further facilitate the redistribution of bandwidth as suggested herein if within the Autoband network architecture and preferably in certain cases within the associated pre-existing network architecture the control over bandwidth distribution allocated to and between individual links, is dynamically very flexible. A good example is cable infrastructure in which a local head-end may receive bandwidth, via Autoband, via a wireless (e.g., high-speed micro cell or microwave) link from Autoband to one of the home LANs which was up to that point an edge node accordingly to distribute bandwidth at a higher level to all its other edge nodes by simply "reversing" the bandwidth distribution on that single link. Assuming bandwidth capacity of the physical coaxial cable exceeds that which previously was delivered to that local head-end, it is now possible. It is also reasonable to apply this technique to the above-suggested example in which Autoband is able to effectively "free-up" considerable bandwidth overall. In the case of a cable or ADSL infrastructure it may be possible in ad hoc fashion to use an unused wireless LAN or satellite dish to run a high-speed link in the Autoband chain link-pathway upstream where the asymmetry of the pre-existing network link is reversed in order to establish a high-speed connection to another node on the Autoband system elsewhere (e.g., upstream above the local head-end or even conceivably at another residential edge node serviced within by same local head-end). This would, in turn, require establishing a very high-speed residential node to the head-end and a very high speed link connecting the head-end to the other (destination) residential node. Because on either (or both) ends the edge node may also tie into the Autoband network, this approach would thus be ideal for bridging breaches in Autoband chain links in ad hoc fashion whenever they occur or providing high bandwidth capacity to residential users via Autoband even if a direct Autoband link cannot be established at that moment or consistently within an Autoband chain link.

Small Autonomous Unmanned Aircraft

In light of the complicating factors in establishing and maintaining consistent multi-node chain link pathways within their highly unpredictable mobile environment even in light of Autoband's extremely adaptable routing characteristics despite the uncertainties of their physical underlying infrastructure, there remains a degree of uncertainty and in sustaining every link simultaneously within a given chain link pathway, in this regards and this issue thus remains a non-inconsequential issue worthy of being further addressed. By virtue of its being able to establish consistent line of sight links between ground and aircraft, but for the extremely short intervals, these line of sight ground to air links can be established due to movement of the inter-linking mobile nodes which, of course, does not apply to stationary nodes, and the overall concept offers the basis for a solution which potentially addresses these concerns by effectively bypassing potentially multiple intervening links each one of which carries with it a certain degree of statistical uncertainty regarding sustainability. This begs the feasibility question of whether it would be possible to establish a plethora of airborne nodes which are spaced intermittently and maintain a fixed geographic position within an altitude of less than four kilometers (the transmission limit for IR laser) yet at a sufficiently high altitude to be able to establish individually directionally controlled communication links simultaneously with a large number of vehicles, stationary nodes and portable devices which are situated in a line of sight which use IR laser technology and when visibility conditions are as such limiting microwave. But for its much greater number of link connections as with a standard Autoband vehicle node, this aerial node acts as a router, cache server and (if desirable) a Web server. It also may be a node on the distributed intelligence DLSI module used for dynamically creating a linking selector and traffic routing strategy for Autoband. The preferred physical characteristics of the aerial node is a very small helium filled blimp-like propeller-driven craft whose buoyancy equilibrium is calibrated to its selected altitude. One of the key ideas of this network is also establishing links between aircraft, which are typically associated with backbone or other very high-speed connections. In the event of weather conditions, which limit transmission distance, it is possible either to revert to the use of microwave transmitters to establish each link, which are individually mounted on the same directionally controllable instrument which controls precise direction of transmission along with each corresponding IR laser transmitter. Alternatively, the craft may move to a low enough altitude to be able to effectively establish IR links with some or all of its target nodes which could, for example, include an automobile which is independent or associated with a chain link pathway in which that automobile or chain link pathway (respectively) is used to provide RF or microwave transmission links to portable devices situated within very close physical proximity, or it would certainly be possible for one of these mobile devices or vehicles to be connected via a microwave link directly from the aerial node and directly link to other portable devices or vehicles within immediate proximity. Although bandwidth is much higher, there, however, may be disadvantages of this latter approach of significantly reducing altitude in that the node's transceivers may be more obscured at such oblique angles and distances which, in itself, may prohibit IR transmission. Thus, in this scenario there may be instances in which different links, even various combinations of transmitting and receiving links for the relay of the same connection pathway, may use, for example, microwave for one link and IR for another in the interest of optimizing network efficiency. In the case of better visibility for air to air compared to air to ground links it may be advantageous to establish longer distance multi-node chain links between these craft and selectively exploiting air to ground opportunities wherever available.

The one obvious drawback of such an aerial node network, particularly in highly populated areas where the system is most usefully deployed, is the associated increased risk of mid-air collisions with moving aircraft. Because of such advances as ubiquitously deployed GPS technology, mandatory flight path filings and advanced collision avoidance systems designed in most aircraft it is likely, however, that such risks could be minimized largely through automated means. By far the most important consideration in this regard is that the risks associated with mid-air collisions could be substantially eliminated by simply adjusting the altitude such that it is substantially below the flight paths of passing aircraft in that particular vicinity and, for example, avoiding regions that are in proximity to aircraft runways. Another consideration in this regard is that because a single craft could cover a substantially large geographic area with numerous links, particularly in heavily populated areas, it would make reasonable sense for perhaps multiple individual craft to share the burden of all of these individual links. During periods of high visibility, these aerial nodes could physically cluster together, acting much like a larger single node, while during low visibility periods, the nodes could separate out and possibly assume lower altitude positions in order to thus minimize average transmission distance by optimizing the physical geometry and possibly the associated atmospheric conditions of the links. In addition, a final consideration is that the craft should be physically oriented such that the number of viable links and particularly the number of important links in their given distribution areas are optimized on average over time. This involves first identifying probabilistically the points where these links are most likely to occur with stationary and mobiles nodes, then positioning the craft such that line of sight visibility is established with as many of these points as possible simultaneously. The model for these probable and important link points may also vary as a function of time and must be continually updated as well. A worthy caveat to note is that the present air-to-air chain link implementation of Autoband provides perhaps by far the highest degree of consistent reliability, i.e., it is the least prone Autoband implementation variation to interruptions of its constituent links. For this reason, in accordance with the below described variation of Autoband used as additional bandwidth capacity to off-load backbone traffic, the present air-to-air implementation is an ideal Autoband implementation for this particular application.

Novel Application for Integrating Autoband Into Existing High-Speed Infrastructures 1. Embedding Periodically Spaced Autoband Transceivers Along the Course of Fiber-optic Cable.

Because transmission capacity across an Autoband enabled wireless network is substantial, it is important to enable a means for providing nodes which tie into a pre-existing high-speed network. In addition, the above disclosure provides a protocol for an extremely ad hoc and geographically changeable network morphology of location of its wireless nodes to be able to functionally behave like a standard (fixed node) terrestrial network. Nonetheless, because of the extremely high bandwidth characteristics of fiber-optics, if the associated transitional nodes which link the Autoband side of the network to the terrestrial side of the network could be physically situated reasonably close to one another, some of the considerable uncertainty regarding availability and sustainability of multiple link connector pathways (the risk of which increases exponentially in proportion to the number of intervening mobile nodes) could be substantially reduced. The basic idea is that it may be possible to embed these nodes located near the "root" or "trunk" portion of the Autoband network. Each node would have processing capability much like the hardware configuration for embedded processing chips located along the course of the fiber-optic cable. This idea of embedding chips within a fiber-optic cable for purposes of network level distributed processing was first discussed in the 1998 publication by Jonathan M. Smith, co-inventor of the present implementation. Each of these nodes would, in turn, be associated with a transceiver unit which links into the Autoband portion of the network using wireless spectrum for its link. Because of the large demands for multiple links emanating from each transceiver, it is important to enable the transceiver to be able to adaptively establish links with multiple devices appropriate to the associated present demand for local wireless connections into the Autoband network in the proximity of that particular transceiver. The wireless transceiver associated with each of these nodes, in one version, which is very simple and low cost could be based upon non line of sight RF spectrum. In another variation, an associated transceiver which is externally visible could be used for purposes of delivering multi-modal transmission links including microwave, RF, IR and (or IR laser). An external power source to power the transceiver will be required in as much as sufficient transmission power for even very short range transmission could not be achieved via the inherent power supply associated with the photons transmitted over the fiber-optic cable network.

2. Total Embedded Transceivers Associated with Electrical Power Lines.

In a related application it may be possible to embed these wireless transceiver-enabled nodes along the course of electrical power lines in a similar system approach fashion. One obvious difference in this system approach compared to that of the fiber-optic cable is absence of the need for any external power source required for transmission. Perhaps the primary difference is that if anything these nodes are likely to be more prevalent as a result of a greater prevalence of electrical power lines. This is also appropriate in as much as the bandwidth capacity of these power lines is considerably less than fiber-optic. For this reason it is likely to be more advantageous on a very busy Autoband system to connect to the network through fiber-optic embedded transceivers as a result of this ability to utilize many more simultaneous links vis-a-vis the substantially larger number of frequency bands, which are multiplexed within the fiber. An only partial means for compensating for the inherently limited amount of bandwidth is to actually utilize the transceiver's own wireless links to connect to one embedded transceiver to the next in order to establish a secondary transmission pathway in this way. In order to further enhance the effective bandwidth accessible via that node, this latter approach should only be used if and when the local bandwidth demands of Autoband connecting into that node presently exceed that of the bandwidth capacity of the power line.

Novel Application and Use of Autoband

It was suggested above that Autoband may be extended into a variety of other wireless device domains besides automobiles, including linking between heterogeneous types of wireless devices. In addition to the obvious variety of applications to terrestrially-based devices suggested above, in one very novel application and extension of the Autoband framework, it may be possible to establish a high-speed P2P "backbone" (possibly ad hoc and thus inconsistently available at certain times from all points) based upon line-of-sight links between automobiles in proximity to one another on a relatively busy roadway or sequence of intersecting roadways where line-of-sight between vehicles is a relatively persistent condition. It should be noted that this implementation may in a variation be essentially identical to the other Autoband applications in which additional bandwidth may be provided to pre-existing networks at various other possible levels in a given network. In light of this fact, because of the inconsistent and ad hoc characteristics of this backbone or bandwidth enhancing parallel network, it would appear that the system is only able to provide it is able to provide additional "bursts" of speed and associated bandwidth during those periods of uninterrupted intervals throughout the day. This, however, is in fact not the case in light of the following characteristics of this "ad hoc backbone":

1. In particular, assuming the preferred high-speed link modality is utilized, IR and IR laser (wherever/whenever high bandwidth demand exists) and assuming that almost all vehicles on the roadways are equipped with the proper linking technology and assuming (very conservatively) that the vast majority of the bandwidth which exists over this IR-based chain link pathway is unutilized for purposes of local data consumption requirements, which is quite reasonable given the huge optical bandwidth capacity of the infrared spectrum. Assuming also that there are 100 primary driving routes which physically could be used to connect one end of the backbone to the other (e.g., Los Angeles to New York) but during heavy demand periods (e.g., business hours) at any one time only 10% of those routes would be able to be utilized to make a continuous uninterrupted chain link pathway. This estimation is conservative in as much as if a primary route is dynamically created to circumvent the interruption no matter how circuitous it may be or even if vehicle links are unachievable local LAN may be interposed or aircraft links may also be used which individually cover very large physical distances. Accordingly, if further capacity is needed more than one route constituting chain link pathways may be established in parallel to route the traffic to its destination which again consist of multi-modal chain links but could be predominantly one or another.
2. A completely "self-healing" network capability which is a characteristic feature of Autoband's adaptiveness which is a result of the bandwidth exchange (described above) which suggests the idea that ad hoc or "bursty" bandwidth enhancements from Autoband can be "traded" for consistent bandwidth which can, in turn, be used to make Autoband, despite its substantially ad hoc nature, actually a very reliable system.

These parallel chain link pathways could also be created to further reduce latency. For example, one of the drawbacks of vehicle links is the fact that the number of intervening nodes and associated re-transmissions is going to have a major overall impact upon speed. This is not that significant a factor if Autoband is used to provide additional supplemental capacity to an existing network infrastructure inasmuch as high priority (time sensitive) packets can be routed through the existing network while the remaining packets can be routed through Autoband. This is one reason why its role in supplying supplemental capacity to an existing backbone is likely a more practical approach than independently providing that function by itself. The one possible exception to this is the air-to-air multi-chain links between and across unmanned aircraft (described above). The key idea is that it should be possible to mitigate this inherent latency problem by virtue of the fact that very high bandwidths are achievable via links using infrared spectrum in combination with a reasonable amount of memory on each node. With regards to memory capacity, invariably any given node (e.g., a vehicle) will have substantially less local memory capacity than a router or more generally more forwarding network node; however, collectively the memory capacity across a large chain link pathway is very substantial and can be used as a buffer either in a store and forwarding routing context or within the context of dynamic pre-fetching. Thus, if one applies this high bandwidth capacity in combination with the available substantial memory it is reasonable that these latency issues can be somewhat addressed. Also, assuming Autoband is able to off-load sufficient traffic congestion at the leaf ends of the network, the latency issues can be further addressed through aggressive pre-fetching as well as data stream aggregation as described in co-pending U.S. patent application Ser. No. 09/842,477 entitled "Method of Combining Shared Buffers of Continuous Digital Media Data with Media Delivery Scheduling."

Different simultaneous duplicates of the backbones could be constructed carrying copies of the same data preferentially with the regionally specific most popular data within the store and forward network topology and/or for purposes of pre-caching thus enabling substantial local user access in convenient proximity of the backbone with an abundance of extra bandwidth. The above referenced techniques of probabilistic predictive modeling of the short-term physical locations of vehicles is quite important in selecting the most efficient chain link pathway in as much as in the packet-based store and forward procedure of the network, chain link pathway should be selected which minimizes the risk of interruption of the data transmission in as much as if another route must be established dynamically it is likely that the packets which ended up being stored beyond the new collateral route will be lost.

In order to decrease the probability of an interruption at cross roads and intersections, ideally signal relays should be positioned at these particular points such that perpendicularly directed traffic is able to establish continuous, uninterrupted chain link pathways as efficiently as if each vehicle were traveling on the same roadway and thus were in direct line of sight of each other persistently.

It is believed that such a high-speed wireless backbone would further provide a significant cost savings to wireless users' mobile nodes, which are on or near the backbone given that the cost of wireless bandwidth is already high and will increase in proportion to the expanding demand and considering that economic models will inevitably charge customers for such bandwidth, which is now reduced visa-vie bringing the users' connect and the backbone itself much closer together.

In the event that an interruption in the backbone is not immediately restored, the link selector intelligence module may be able to make certain probabilistically based predictions for both the present chain as well as other potential candidate chain alternatives for purposes of replacement of the current chain constituting the backbone. In the first case, it may be possible to establish a series of multiple "collateral" links, which utilize a different typically lower frequency, lower bandwidth transmission modality. Typically, there are more than one, perhaps multiple parallel links established in parallel to replace that of the broken link, i.e., typically RF or an intermediate frequency range in between RF and microwave. In the second case, it may be possible to use the link selector intelligence module to re-route communications links on both the traditional Autoband (wireless device) network as well as other wireless and terrestrial networks.

In a more sophisticated version of the present system, it may be possible to establish more than one chain for transmission, each one with its local frequency bearing a certain portion of the requested transmission data as links may often become less bandwidth available as alternate links connecting to other less desirable devices may by requirement take the place of a given link.

Interference is another effect requiring that the system dynamically and instantly vary the source of the transmitted file or present focus of the transmission gateway. A high-speed backbone typically with significant memory provides routing functions of the associated high-speed data.

Thus, there may be limitations as to how much over congestion can be safely tolerated without overtaxing the backbone. The above ideas for designing a high-speed backbone is fairly complex. Thus certain speed-limited criteria may be necessarily integrated in light of constructing a reasonable and reliable wireless router. Of course, the present P2P design is efficient. By enabling the above wireless router concepts, in standard Autoband P2P communications, it is possible to establish a 2-way network with routing and retransmission with capabilities, which effectively falls back upon a variety of other wireless communications devices and specific networks with (likely) a more dense bandwidth intensive network links overall. This scenario can co-occur with Autoband's truly high-speed (line of sight) backbone concept and, in fact, can be a fallback position for whenever the backbone cannot maintain its high-speed connection whether lower or higher speed is usable and appropriately the link selector intelligence may identify these more opportune links (e.g., with high-speed passing LANs or aircraft passing overhead) than that with another vehicle at any point in the chain. Particularly, since connections may be breached and reestablished across a variety of conjointly changing connection device platforms and specific networks and even in this case available bandwidth, the link selector intelligence is a very important capability.

The Autoband Bandwidth Exchange

The various transmission link modalities and hardware configuration examples of Autoband which have been cited up to this point effectively set the stage for a very salient and novel characteristic of Autoband which is potentially very powerful and a significant value proposition in enhancing total bandwidth capacity. Because nearly all of the implementational variations of Autoband herein described have the characteristic of providing bandwidth based upon multi-node chain links which is potentially very substantial, however, also, unfortunately, dependent considerably upon largely unpredictable ad hoc variables which are locationally dependent upon random behavior activity patterns of humans. This characteristic of Autoband as an independent source of connectivity and/or bandwidth capacity would present an obvious weakness of the system associated with the uncertainty and unreliable nature of these resources. In its use as either a potential additional supplemental source of bandwidth to existing network infrastructure or as an independent source of connectivity, this reliability issue may, however, be successfully addressed for theoretically any type of network, which has bandwidth asymmetries in which Autoband can provide supplemental bandwidth for at least some of its associated links, which are being actively-utilized. On an abstract level, the present idea effectively uses the fact that on average and, on a macro scale, all of the Autoband transmission pathways which are active and viable at any given moment in time add a significant amount of bandwidth to a given network on a collective scale. This fact can often be effectively utilized to mitigate bandwidth limitations at any given link residing at the same level in the asymmetric bandwidth network's tree hierarchy where that additional bandwidth capacity collectively exists (e.g., last mile bandwidth bottlenecks or even limitations on a given network if mitigated by bandwidth resource improvements on another network). A simple example is that if Autoband provides parallel chain link pathways to increase effective bandwidth utilization through, for example, the leaf ends (the most bandwidth constrained portion) of a network whenever possible in certain branches but not in others, it is possible in these localized branches for these locally significant bandwidth increases to produce greater throughput of the file request queues at these local segments, and in so doing enable the delivery of greater overall capacity to the entire population of edge nodes serviced by that particular data distribution server node. The one caveat is that because Autoband links can be very high bandwidth, it is possible that the Autoband system in combination with the pre-existing bandwidth of all actively utilized links served under the same data distribution node as that which is considered could provide more capacity than the total transmission capacity by all of these actively utilized links combined (i.e., within that given distribution node), thus this bandwidth redistribution concept for Autoband is typically very efficient but only up to the point of these capacity constraints of the physical data transmission infrastructure). This limitation in the physical capacity of the infrastructure thus constitutes a limitation as to how much bandwidth Autoband can actually provide through off-loading of bandwidth loads from other topologically parallel or lower portions of the network's hierarchical tree structure.

Wireless networks with perhaps even more edge nodes per data distribution server have a reasonable amount of potential bandwidth capacity and under the present scheme its channels can be adaptively consolidated for use at any given edge node up to any extent barring interference with any other devices in local proximity and of course competition of those channels by devices serviced by that particular base station which are presently in active use, therefore, this environment (whether RF cellular or satellite) is an ideal transmission modality for use within the present bandwidth trading scheme.

As an example situation, of how a barter might work, Autoband selectively identifies and provides bandwidth enhancements to a terrestrial network. The terrestrial network not requiring that bandwidth per se trades it to a satellite network which, in turn, trades that same amount to Autoband which uses it to bridge ad hoc gaps as they occur in its chain link infrastructure. On the other hand, an ad hoc "gap" could simply be a vehicle, device or other edge node which is presently out of range of Autoband links or practically speaking the network resources are not economically prudent. This example implementation involves Autoband trading into the exchange a portion of its bandwidth in exchange for connectivity to the target edge nodes as in the above example vis-a-vis a wireless network, although several other approaches are feasible. Conversely, if there exists "patches" or clusters of vehicles or associated close proximity devices which are themselves target edge nodes for transmissions and are mutually within linking range of each other rather than consume satellite bandwidth, it would be preferable for Autoband chain link pathway to be created from each cluster and connectivity/bandwidth capacity to be delivered from local high speed terrestrial network infrastructure as suggested above.

Another example herein involves a backbone, which traverses a particular geographic area. At least one contiguous unbroken high-speed Autoband chain link pathway can often be potentially established at any given moment in time, which connects the points constituting the beginning and end of that backbone or segment of the backbone. In addition, because of the high-speed nature of many of Autoband's links the localized demand over these links represents the minority of their associated available bandwidth capacity. In this scenario, it is possible to effectively use the spare bandwidth provided by Autoband which covers the same segment or all segments of the backbone in order to off-load traffic loads on that same portion(s) of the backbone. Typically, the economic model used in this scenario, compensates the operator of the Autoband-enabled network and/or its constituents for the utilized bandwidth capacity which is off-loaded by Autoband.

In one variation which is applicable to both of the above scenarios, it is useful for a given network to effectively trade into a "bandwidth exchange" or pool a portion of the overall bandwidth which a given network is able to save by virtue of Autoband for purposes of "bridging" points of unreliability in Autoband's chain link pathways which consist of unachievable or "breached" links in the Autoband system, wherever and whenever they occur (dynamically in a relatively ad hoc and unpredictable manner).

A market exchange with standard market exchange features as well as bartering may be used in this way to exploit and thus achieve optimal mutual value exchange opportunities between Autoband and a pool of different networks. Above is suggested different ways by which this "bridging" could occur. In one example, it uses terrestrial network connections which are somewhat limited in both bandwidth availability and points of interconnection or gateways between the two different system's networks. These "gateways" are themselves physically specific. This locational dependency in itself further adds an additional degree of unpredictability in the ability to provide this additional bridging if/when it is necessary without any delays or lapses. For this reason, although many types of networks can benefit through the use of ad hoc bandwidth vis-a-vis the technique presently discussed, satellite networks are nonetheless an ideal transmission modality for actually bridging these gaps within an Autoband system.

Variations of this general market exchange idea may also include, for example, the length of a particular backbone or segment thereof that cannot be completely bridged by a parallel Autoband pathway that Autoband may combine its physical geographic coverage with that of another (or other) networks which could physically bridge the gaps and have bandwidth to spare. In another variation similar to market based bandwidth exchange, it may be possible to use a similar approach similar to one already published in the technical literature. Such that it is possible to perform this type of ad hoc market trading approach for also trading processing power as a tradable utility. Because the application loading requirements, are significant compared to the ad hoc nature of the network linking opportunities, this approach may be somewhat more limited than the simple Autoband bandwidth trading s scheme suggested above. Nonetheless, it is anticipated that increasingly large amounts of processing and memory will reside at the client level in such ad hoc network environments as Autoband in the future. A reasonable implementation strategy using software components are described above. It should be noted that the application to the present novel bandwidth exchange in its primary applications to enhancing bandwidth capacity to other networks as well as making more reliable and consistent Autoband's connectivity at all levels could be readily integrated into a more general type of bandwidth exchange system in which networks can exchange (buy, sell or barter) bandwidth between themselves outside of the context of Autoband per se.

One concept is to control traffic signals on a rather dynamic basis such that the traffic flow patterns are predicted to form an optimal pattern for creating continuous chain link pathways where they are most needed based upon observed traffic patterns.

The other is regarding the above section entitled, "Reversible Router Architecture." The present idea of using ad hoc high bandwidth Autoband links (i.e., "bursts" of bandwidth) as discussed above in the present application in which the use of ad hoc high bandwidth from Autoband becomes a potential bridge between a local data distribution node and an edge node which presently possesses a request(s) in the queue is a very useful technique for reducing the length of the request queues for delivering requests in an asymmetric network; however, a few special design considerations must be integrated into such a system. For example, because these requests in queue are prioritized in the order by which the requests were placed, it is important to determine which particular ad hoc Autoband connection pathway is strategically the most advantageous. This, of course, is determined by various key variables and an associated network level strategy which is developed by the DLSI. Once the connection strategy is determined, it is additionally useful to utilize the adaptive bandwidth control capacity of the local router to increase the bandwidth capacity over the connection to that particular leaf node in which this extra ad hoc bandwidth is available at the time that a request by that node exists in the queue. This is an essential feature to achieve the desired objective of "freeing up" bandwidth loads along all of the leaf end connections of that local data distribution server. Of course, this approach is most effective relatively speaking if these requests in queue are large files. In addition, even if a request has not been specifically placed at a given local leaf end node, it may be useful to take advantage of this high bandwidth opportunity or "window" to fill that presently available additional bandwidth with speculatively retrieved files using the techniques of anticipatory pre-fetching such as those described in the parent patent application which may be either of a dynamic or non-dynamic nature. There are various types of exemplary data transmission scenarios in which this specialized adaptive router is invaluable. For example, in the event that the optimal transmission pathway involves an Autoband chain link pathway which connects a local data distribution node to an edge node using the pre-existing terrestrial network connection infrastructure and if Autoband is able to provide high bandwidth chain link connectivity between that edge node and other edge nodes which have pending requests in the queue, it is useful to again take opportunistic advantage of the additional bandwidth capacity presently available between those local edge nodes by prioritizing their requests and/or performing predictive pre-fetching of potentially useful files to those Autoband connected nodes. However, in a typical network whether terrestrial or wireless, this will require temporarily increasing the bandwidth capacity over the pre-existing connection infrastructure constituting the link between the data distribution node and the edge node within the pre-existing network. In another exemplary case, there exists a greater bandwidth capacity through an Autoband chain link to a local community serviced under a data distribution node that is directly available to that local data distribution node via its existing communication infrastructure. For example, Autoband may be able to establish a temporary connection to a fiber-optic trunk and establish high speed chain links to a local home terminal. That home terminal may, in turn, be able to establish a temporary high speed connection with the pre-existing local distribution between servers using the presently discussed adaptive router techniques utilizing a wireless or even a terrestrial cable infrastructure for this temporary high bandwidth up-link. The local data distributions node (e.g., serving 100 homes), if it is a very local node, may further be able to off-load traffic loads form the primary data distribution node which is further upstream (e.g., serving 500 to 1000 homes). It is also possible, given the substantial amount of buffer memory in the Autoband nodes, that this architecture may be a transient transmission scheme for optimally matching local demand with local availability in ad hoc fashion between Autoband enabled vehicles and edge nodes located on a different network which are located in the same physical proximity at the time that the demand exists as requests are made or pre-caching opportunities are detected. Again, typical pre-existing wireless networks will offer substantially greater bandwidth if it is needed on the up-link than a terrestrial network due to the physical bandwidth constraints of its associated links.

In another exemplary case, an Autoband chain link pathway enables greater bandwidth accessibility from a data source other than the pre-existing bandwidth to the local data distribution node. In this way, higher speed data access from the desired data source may be delivered to the local data distribution node via an Autoband chain link pathway. This other source could be, for example, a node on a fiber-optic network. It could be applied to terrestrial networks or alternatively wireless networks such as, for example, cellular base stations or wireless routers. The other exemplary cases, as briefly suggested above, suggest that such a reversible router architecture, for example, in the context of a terrestrial network (but it may encompass other types of networks as well) utilize existing asymmetric communication infrastructure to establish "bridge" connections consisting of an upstream high bandwidth link from an edge node to a local (or regional) data distribution node and accordingly utilizing another link between that node and another edge node, thus establishing an edge node to edge node high speed connection with the most local commonly shared data distribution node as the intermediate node in this connection. The adaptive router capability is necessary within this context to provide extremely high bandwidth upstream, thus reversing the bandwidth asymmetry of that link, and ideally uses all of the downstream capacity as "dedicated bandwidth" for the presently needed data transmission. This connective bridge may either:

1. Provide high bandwidth connectivity to a standard edge node on the pre-existing network (in which the data source is an Autoband chain link pathway connecting and delivering high speed data to the edge node on the other end of that connection bridge.
2. The data source is one of the edge nodes and the destination is another edge node on the other end of this flexibly and transiently constructed connection bridge (this variation does not require the involvement of an Autoband chain link pathway).
3. The data source is an edge node on the pre-existing network, and the destination is a node at the end of an Autoband chain link pathway, which exists at the other end of the connection bridge.
4. The data source is a node on one end of an Autoband chain link pathway; the destination is a node on the other end of a different Autoband chain link pathway where both of these chain link pathways are connected visa vie the intervening connection bridge.
5. The data source is a node on one end of an Autoband chain link pathway, (i.e., either an Autoband node or a node on another high speed network). The destination is a node on the other end of two juxtaposed connection bridges, one consisting of terrestrial network links and the other consisting of links within a local wireless RF cell or the destination may be a node on the Autoband chain link pathway and the origin is a node at one end of one of the two juxtaposed connection bridges or the data source is a node on one end of the connection bridges (e.g., the terrestrial network) and the destination is a node on one end of the other juxtaposed connection bridge (e.g., consisting of wireless cellular links). By virtue of Autoband's ability to provide bandwidth to any network which participates in the bandwidth exchange, it may even be possible for the scenario to exist in which the data source is an edge node on one end of a connection bridge and the destination is an edge on the other end of that connection bridge in which the connection bridge consists of a single up-link/down-link high speed connection on a local RF wireless cell. It should be noted that in the case of wireless cellular connection bridge, these associated high speed links for the up-link and down-link, respectively, must use the technique of frequency hopping in order to avoid interference with existing wireless links of actively used devices on their own respective frequencies. In addition, it should be noted that such wireless connection bridges with the local transmitter may, in some instances be unnecessary if a direct peer to peer connection link is within range and an additional caveat is that because Autoband, these local wireless cells and their associated high speed connection bridges overlap in both frequency usage and geographic location, it is important for power to be adjusted dynamically for both Autoband and the overlapping similar frequency wireless links such that interference does not occur in spite of this same frequency/geographic area overlap.

Of course, as with any chain link pathway, it also may contain an intervening link(s) from another network(s) which bridges gaps in Autoband (where a chain link is infeasible). In the preferred scenario these bridges are themselves reversible router connections associated with a standard RF cellular wireless network in which the router associated with the local transceiver establishes a high speed connection bridge in accordance with the connection bridge architecture described above. It should be noted as is herein exemplified that it is much more bandwidth efficient to establish a connection bridge connecting to and from a local wireless transceiver instead of connecting to and from a satellite (i.e., its associated router). This bandwidth connection principle of preferentially constructing these bridges at a "distal" level in the network applies to virtually all network scenarios in as much as there is collectively increasingly greater data carrying capacity further out towards the edges of the network.

Of course, a reversible router may also exist higher up in the network, and in this scenario, it is possible that the uplink and the down link of the connection bridge even exist on different networks. In another exemplary case, the reversible router is a wireless router. Because these cellular wireless based connection bridges may often tie in seamlessly into Autoband (as suggested in the above examples) it is also of value if the reversible router architecture is able to use the above described capabilities of Autoband to adjust frequency specific channels to specific power levels which control the distance of that corresponding frequency specific cell on a dynamic basis to assure the desired wireless link while at the same time assuring that there are no areas of interference within that cell with other nodes which are either presently actively engaged in Autoband links or in another cellular system's high speed connection bridge. This is also to say that a connection bridge from even one cellular network could encroach upon that of another cellular network cell. If the encroachment does not involve any present interference from other devices in the encroached cell at that particular frequency range and at that particular moment in time or if such an interference does occur it may be feasible so long as the power level of the encroached cell is relatively strong compared to that of the encroaching cell. Thus, in this way power level adjustments between both networks' cells may need to cooperate together in order to avoid interference while achieving the desired links.

Additional Technical Methods which Could be Usefully Integrated as Part of Autoband 1. New Wireless Band Using Broad Spectrum "Pulses"

In the wireless communication field, there has recently been some discussion about the introduction of a new wireless transmission technology which effectively overlaps with all of the existing FCC allocated wireless spectrum, yet its communication transmissions are able to effectively overlap in physical space with all other wireless transmissions occupying the same spectrum within the same physical space without the danger of causing interference with existing signals. The idea is effectively to transmit signals consistent of "pulses" which cover a very broad spectrum (substantially all of the existing wireless bands) for just one channel. Apparently, because the pulses are extremely short and the signal is substantially distributed over many different bands, a signal carried on an existing frequency band would be substantially unaffected as the pulse would be interpreted as a certain acceptable amount of noise on that particular frequency band. Accordingly, it would be appropriate, feasible and reasonably straightforward to incorporate the same type of idea, in the case of Autoband, micro-cells which are jointly occupied with traditional cellular transmission channels as well as those corresponding with the present new technology. One primary difference would be that because the Autoband system has no inherent predisposition with its dynamically moving transmitters and receivers, and at times high density of these communicating devices the new pulse signal technology could perhaps be a useful means for enabling a micro-cell which is anticipated to interfere with another micro-cell to be able to dynamically to the pulse signal technology, even if it is in the midst of an existing transmission. Alternatively, it is even conceivable that the present pulse signal technology could be used to add an additional amount of broad band spectrum to an existing broadband transmission link utilizing the traditional broad band transmission modality. For example, this additional broadband capacity for a given signal would consist of additional pulses which are synchronized differently from one another, though each occupying the same broad band spectrum. It is perhaps worthy to mention that based upon the known, physical properties of wireless communication signal because the pulse signal technology is able to avoid interference by virtue of its wide spectrum distribution; it is therefore reasonable to assume that it is likely to have less of a negative effect upon existing wireless transmission signals transmitted on existing frequency specific bands. In this way the pulse signal approach may be beneficial, with not only dynamically avoiding interference with other Autoband transmissions using traditional wireless channels, but also in avoiding interference with standard wireless cells. This being said, there is, however, the caveat that if pulse signal channels become allocated for mainstream wireless communications, that these additional advantages of avoiding potential interference between similarly occupied spectra within physically overlapping micro-cells and standard wireless communication cells whose signals are mutually transmitted via the pulse signal method has yet to be seen. However, the possibility still remains, and is a reasonable conjecture, that differentiation of the two signals could be achieved either by slight "shifting" of the timing thereof (perhaps the equivalent of frequency splitting where in this case, the signals are moved into other timing based channels which occupy the least amount of local signal strength to that of the micro-cell). Thus, the movability of interference are effectively minimized. In addition this idea of a synchronicity shift may perhaps be further combined with a frequency splitting approach, in as much as certain spectral portions of a given broadband signal pulse are likely to be less powerful than others, therefore, it is possible that, for example, the part of the signal may be shifted into a differently synchronized pulse at a high frequency spectrum, in as much as the interference is minimal at this particular synchronized timing, however, the lower range spectrum of other close pulse signals promotes less interference when the highest range portion of the spectrum of the overall weaker pulse channel, thus it is most efficient for the present Autoband signal to shift into primarily into this weaker pulse channel but for the highest portion of it to be avoided and instead that remaining portions of the signal instead shifted into that portion of another (overall a little stronger) pulse channel which consists of the lower frequency spectrum of that channel, which is, however, weaker than that highest frequency spectra of the original primarily utilized channel. The one obvious exception to this scenario is if part of the frequency of the channel actually extends up into a range which is partially directional in nature, thus with the proper hardware on the receiver this stronger, highest frequency spectra could be effectively avoided without interference.

Pre-Caching of Codebooks

Issued U.S. Pat. No. 5,951,623, entitled "A Lempel-Ziv Data Compression Technique Utilizing Dictionary Pre-filled with Frequent Letter Combinations, Word and/or Phrases" provides a system for quickly analyzing the informational context of text documents, in order to determine an optimal code book containing word compression characters, in order to select the codes from a code book corresponding to terms in the document which if pre-loaded to the receiving terminal prior to transmission would result in a net savings on bandwidth by then being able to then send only the code during transmission of the document. The particular invention also reduces the amount of characters for a given transmitted document by reducing the average size of the "codes representing the textual terms, of these codes which are selected for pre-loading prior to transmission of the document. In the case of video or graphic information, a variation of the same approach could be usefully applied in similar fashion. Because these code books are relatively considerable in size, a further extension and potential enhancement to this present concept of pre-loading of code books immediately before transmission of a file could also involve predictive pre-loading of those code books (whether for text, graphic, or video), which correspond to those particular files which the system predicts are likely to be transmitted subsequently based upon the basic techniques of similarity informed pre-fetching the reference for which is mentioned above. The primary difference in pre-loading of code books, because the associated quantity of data is much smaller than that of the corresponding file and thus it makes sense to perform the pre-fetching, whether it is performed statically, long-term or dynamically very short term, much more aggressively and liberally from a probabilistic standpoint. For example, based upon physically when certain devices are likely to be situated with respect to certain individual (most notably the automobile or certain devices belonging to their owner) to retain a more extensive set of code books than simply those associated with pre-cached files. In addition, there may be, in the case of Autoband, frequent instances in which temporary high bandwidth linking opportunities may exist in which file transfers can occur liberally with very little impact of bandwidth (e.g., a vehicle passing a transceiver local to a server or another nearby vehicle on the highway which happened to contain a file of potentially predicted interest to the user). In addition, it should be noted that if the desired objective is to decrease latency in file transmissions one may want to be more liberal in pre-caching of code books in as much as this would off-load real time transmission of the associated code books prior to transmission of the contents of the associated file. There are of course, other types of data compression approaches which could also conceivably apply to this concept of predictive pre-loading of compressed data which is in some way probabilistically descriptive of a target file and this probabilistic approach of pre-loading such associated compressed descriptive data may also apply within the present context and thus the use of code books for this purpose is thus in no way intended to limit the scope of the claimed invention. For example, one could utilize features of neural nets or fractals for graphic or video-graphic data formats.

Further Applications

It may be possible to also create an ultra-high altitude network of optical wireless relay stations situated either above or away from the flight routes of commercial air traffic across continents or oceans much like the low altitude relay stations, however, which are designed to provide high bandwidth backbone connectivity over long distances. Because at very high altitudes, air molecules are sparse and moisture is almost absent, optical transmission frequencies higher than traditional infrared (perhaps into the visible range) may be possible on a consistent basis and for relatively long distance transmission ranges. The disadvantage of such a network is the issue of high wind speed, thus it is likely that a large number of such floating relay stations may be necessary at regular consistent intervals in circumglobal fashion such that even though they are constantly in a state of motion at any give location and point in time there is always one which is within transmission range. Typically, these relays communicate with points on the ground in point-to-point or point-to-multi-point links using microwave transmissions, or the network could connect directly into the low-altitude relay station network. It is also useful to consider the idea of a highly adaptable optical transmission system that can adaptively vary the specific wave length spectrum in accordance with the present atmospheric conditions which exist over the course of a particular link. In particular, the degree of quality in the transmission signal at any given wave length (EGIK) would be suggestive of what frequency range would be the highest range for the particular bandwidth to be delivered over that link in view of the intervening distance which that link must traverse. If during the course of transmission over such a link, the quality of transmission degrades below acceptable levels, the system may again use this signal quality as an indication of which frequency range the link should modulate down to while still maintaining the highest possible frequency range possible under the present atmospheric conditions, and in light of the amount of bandwidth required for transmission via that link. A certain degree of modulation of frequency of the transmitted link may be achievable, however, invariably different physical laser emitters will be required for such a wide frequency range up to that of the visible range. Although it was not discussed in Autoband, this concept would be equally relevant to other implementations within Autoband such as IR beneath the grill and the somewhat higher power IR laser instantiations as disclosed in the Autoband specification.

Market Model for Dynamically Eliciting Locationally Opportune Mobile User Behavior which Enhances Autoband Connectivity This idea applies a very similar technique to that employed by the DLSI in its role in predicting and determining optimal routing decisions and associated chain link pathways. In this market model approach, within certain limits the DLSI further is able to use this market model to pro-actively manipulate the physical locations of vehicles or other Autoband devices. This pricing, however, should be probably sufficient statistically speaking to elicit the desired behavior unless a high degree of certainty is required. A few examples are considered:

i. Providing an adequate monetary incentive for sparsely located automobiles (e.g., traveling in relatively non-populated areas or during late night hours) to maintain reasonable proximity to one another yet with sufficient enough intervening distance to take maximal advantage of stationary fixed connection opportunities. It is even conceivable specific desirable travel routes, e.g., to enhance connectivity may also be suggested and appropriately incentivized if followed. Proximal groups of vehicles would further retain in their caches data which is potentially and predictively relevant to all vehicles in the group and, in particular, at that time. However, travel behavior which is "inconvenient" to the user would require a higher degree of incentive and in deriving an appropriate pricing scheme, the system must balance the desire or convenience (motivational factor) of a user to follow the recommendations against the importance of that behavior to the Autoband system as a whole. Thus in many cases in order to effectively elicit an urgently needed behavioral action on the part of a given user, a higher price in proportion to the degree of urgency for that action will be provided accordingly, and the increased price adjustment would be proportional to the degree of importance as well as the degree of inconvenience to the user. Of course, the pricing objectives will be to evaluate these various factors in light of historical data regarding price and associated behavior for specific actions. The strategy scheme may also incorporate rules which balance on one hand the degree of urgency of the behavior against the anticipated price needed to achieve that behavior. Also, particularly, if the urgency is high, and if the inconvenience is also high, the pricing objective may not necessarily be to achieve the lowest anticipated price required to elicit the action but a somewhat higher price which will increase or maximize the degree of assurance of that behavior. Essentially, the present scheme for attempting to anticipate the minimum requisite incentive needed to motivate (react as a catalyst) for the desired user behavior will require considerable statistical analysis to predict these market price points based upon inferences gleaned about the true motivational status of the user with respect to the desired behavioral actions and statistical analysis also required to establish correlations between a given user's behavior and these motivational states with regards to these prospective actions.

ii. Incentivizing specific desirable driving behavior patterns, e.g., keeping automobiles in a line of sight and within certain distances for present or predictively anticipated chain link pathways such as with IR links or as in the case of IR laser links or, e.g., maintaining but not exceeding or falling below a certain speed or providing for an automobile, for example, to "catch-up" to a chain or chain conversely to catch-up by modifying temporarily the vehicles' speeds, accordingly, thus incentivizing the driver not to cross lanes in front or between receiving or transmitting vehicles during the transmission process.

iii. Manipulating traffic signals in order to elicit the proper driver specific behavior or more importantly, behavior patterns of all vehicles in aggregate affected by that signal at that time. Of course, similarly to the other incentivization schemes, the key idea is to have, in this case, a dynamically adaptive system which can make decisions regarding a driver-specific incentivization scheme which is based upon behavioral the actions for all users which serves the interests of all users (or more specifically the "market" of users). Similarly, to that of determining the optimal selection of communication links in order to dynamically construct the most efficient transmission pathway for a given requested communication, the present application for controlling timing of traffic signals as could be used to achieve optimal distribution and spacing of vehicles to achieve optimal communications pathways at a system level could represent a useful collection of extension variables to be incorporated into the multi-dimensional market model as utilized herein for purposes of establishing optimal communications pathways in general.

iv. It may be possible to embed wireless transceiver-enabled nodes along the course of electrical power lines. In this case, there is no need for an extra power source for transmission. These wireless transceiver-enabled nodes are likely to be more prevalent as a result of a greater prevalence of electrical power lines. Since the bandwidth capacity of these power lines is considerably less than fiber-optic lines, it is likely to be more advantageous on a very busy Autoband system to connect to the network through fiber-optic embedded transceivers.

Secondary Observations and Noteworthy Commentary on the Present Autoband Applications Regarding distributed processing architecture for ad hoc networks, the basic approach is to use software components, which are predictively anticipated to match the particular applications, which are needed at any particular location and time and to perform pre-caching of those components. The idea is to initially design the network architecture using packet switching based upon frame relay techniques and use the peers in the chain as routers in a pre-determined pathway. This would presumably enable the conditions by which it would be possible to also enable the system to be able to optimize selection of the appropriate application level components for pre-caching purposes. Or to the extent that this is less critical, the routing pathways along with their distributed application processing can also be performed in somewhat of an ad hoc fashion as well.

It is indeed likely that using some of the predictive models and most importantly location based anticipation for purposes of matching the location of specific devices at specific predicted times with the predicted need of specific applications at specific physical locations and times where the processing of those applications will be needed could be valuable for ad hoc distributed processing. Predictive modeling of processing applications in a distributed system framework which could be useful in terms of selecting connections/connection pathways on a very dynamical basis is well described in co-pending U.S. patent application Ser. No. 10/202,070 entitled "Method for Automatic Wavelength in a Wavelength Division Multiplexed Fiber Optic Communication Network" in its sections entitled "Implementation Considerations" and "Applications" which are herein incorporated by reference. This novel concept could leverage much of the ideas discussed in co-pending U.S. patent applications entitled "Location Enhanced Information Architecture" and "Secure Data Interchange" referenced above and a locationally adaptive pre-caching system which leverages anticipatory user movement/location patterns in order to geographically migrate caches around the network as well as cache locationally relevant data which could include applications or constituent components thereof also to the servers local to the user and the associated client devices. These applications are hereby incorporated by reference as well. Typically, the relevant software components associated with those applications represent the data being pre-cached within this particular adaptation of the pre-caching system.

With consideration to the following idea assuming that 90% of all cell phones and other devices serviced by any given base station are turned off (or are not in use) at any given time, it should be possible to use a variety of techniques in order to insure that a given micro-cell within a given chain link pathway located within that base station's cell in no way interferes with any frequency band which is currently in use.

The idea, to clarify a bit further, involves using micro-cells of other devices to "fill in" the gaps between chain links either become broken or otherwise are not feasible using short range micro-cell link modality used within the rest of the chain. This objective is achieved by:

a. Whenever a gap "occurs" identifying the closest neighboring devices to each gap which are currently and likely predicted to be presently not in use; and
b. Applying selected devices or transmitters to fill in these physical chain link gaps. This involves using LEIA to select those devices which are located at the most opportune locations and at signal strength levels that will assure avoidance of interference with either other nearby micro-cells or other standard cellular devices which are within transmission distance of these new larger range micro-cells.

Thus, as a result, it is possible to optimize effective bandwidth spectrum which can be delivered across each gap automatically and on a dynamic ad hoc basis. Of course, if the most opportunely located "device" (per the above criteria) happens to be the base station itself, the present methodology could automatically select the unused bands for that base station creating its own micro-cell by limiting the power (thus transmission distance) to only that which is required to establish the necessary link in order to optimally minimize interference with other links or potential links which connect within that same spectrum range. Of course, as suggested above, this methodology applies equally relevantly to not only gaps but any link within a chain link pathway. In addition, providing optimally available amount of wireless bandwidth spectrum to that particular pair of nodes on either side of the gap, requires the use of frequency hopping techniques in combination with very carefully controlled transmission range control. Accordingly, the present system objectives are achieved by the use of a dynamic internal 2-D "map" which identifies where all presently existing and potentially useful (alternative link) micro-cells are located, their associated physical ranges and the frequencies which each cell presently contains and the potential range limitations for each present or potential candidate micro cell's associated device.

Based upon the knowledge at any given moment of the locations, frequencies, transmission ranges, etc., of each micro-cell and macro cell (base station cell), one of the present approach's key attributes is the use of the system's dynamism in continually adaptively modifying and updating the overall bandwidth delivery strategy in order to optimize the frequency band distribution from the most opportune local devices which are able to bridge these gaps. In this regard, it is also possible that in order to achieve this goal of optimizing bandwidth delivery, for either these gaps or potentially any link, it may be useful in certain specific cases of nearby micro cells which would otherwise encroach upon a given link(s) in the chain to establish the link using actually more than one local node for purposes of establishing the desired link, each delivering a different range of the ultimately available spectrum in order to avoid interference with other cells which would occur if one device micro-cell were used, but could be avoided if more than one device micro-cells were used, each of which respectively avoids the frequency channel or spectrum range as in another micro-cell which would have been otherwise encroached upon by one single micro-cell such as a micro-cell(s) situated laterally and within interference range or any single device alternative to that link. This encroachment is avoided by instead using two micro-cells in which the physically overlapping portion of the two different transmission pathway cells reside on different frequencies and the other portion of the broad band spectrum delivered which does overlap in a frequency context, instead is associated with a different device micro-cell which is physically offset from the other transmission pathway's micro-cell situated on the opposite side of the chain link pathway, thus avoiding encroachment of the same frequencies and thus interference. This optimally avoids interference and thus optimizes spectrum availability at any given location or time in totally ad hoc fashion within potentially any chain link pathway.

It is assumed and understood that the actual use and dynamic implementation of infrared laser within a dynamic mobile environment (e.g., automobile chain links) is a novel concept. There may however be certain additional implementation-related concerns regarding automobiles inopportunely breaching these connections, however, assuming all vehicles are equipped with this technology, the "interfering" automobiles would simply become another node (temporarily or permanently in that chain link pathway or it may even be possible to transmit such a laser through the intervening automobile's cabin). In addition, one of the major rationales for creating an elaborate and highly adaptive ad hoc bridging scheme as well as the bandwidth exchange is exactly to compensate for these inopportune ad hoc interruptions, e.g., consider switching to microwave, an intermediate band just below microwave, if line of sight is obscured, or IR links with aircraft (or the low stationary aircraft suggested for this purpose).

Certainly, this type of ad hoc IR connectivity could be very useful for ad hoc network level distributed processing because of the bandwidth advantages of IR (relatively speaking as compared to lower bands) and the fact that this subvisible light spectrum compared to that of lower frequency links could be advantageous from a processing speed standpoint for the reason discussed in co-pending U.S. patent application entitled MICA (i.e., as a result of the fact that frequency modulation would be minimized between the processor hardware and the transmission links which connect these associated processing nodes together in addition to the fact that higher bandwidth is achieved in this regard). This is a primary reason by which the processing speed of a distributed wireless peer to peer network can be enhanced at least under conditions in which the higher bandwidth (less modulated) infrared spectrum links can be selected opportunistically. In addition to bandwidth for communication, distributed ad hoc network level processing requiring very broad spectrum connectivity and the associated MICA advantages, constitute, a reasonably compelling argument as to why a low level network of floating IR laser equipped relay stations which connect into automobiles, residential, office and even mobile devices would make the development of this network economically feasible, particularly where pre-existing terrestrial network infrastructure is deficient. The cost should be considerably lower than the use of satellite on a mass scale within a reasonably geographically focused densely populated area. For reasons of minimizing frequency modulation in order to increase speed, it may even be a consideration within the context of these low altitude relay station devices to use further processing hardware optical components. This would be particularly useful in as much as all or most of it link connections would be based upon infrared transmission.

Within the complex ad hoc network environment of Autoband, the adaptive transmission modality feature as well as each of the other multiplicity of ideas as herein disclosed are extremely important when integrated together collectively, each as component parts of the overall system and thus much more than simply a consideration for achieving optimality as one might construe at first blush to achieving a viable system for delivering high bandwidth connectivity wirelessly, reasonably consistently and on demand.

Those skilled in the art will also appreciate that the invention may be applied to other applications without departing from the scope of the invention. Accordingly, the scope of the invention is not intended to be limited to the exemplary embodiment described above, but only by the appended claims.

What is claimed:

1. A method of establishing a communication pathway between a source node in an ad hoc communications network and a destination node in said ad hoc communications network for transmission of a predetermined quantity of data, comprising:

establishing a communications link between said source node and an intermediate node, where said source node and/or said intermediate node move into and out of range of each other but stay in wireless communication range of each other in a selected wireless transmission modality long enough to permit transmission of said predetermined quantity of data from said source node to said intermediate node; and dynamically reconfiguring an ad hoc communications pathway between said intermediate node and said destination node based on dynamically changing transmission conditions and available transmission modalities therebetween as said intermediate node and a next intermediate node or said destination node move into and out of range of each other by dynamically selecting dynamically selectable communications links between said intermediate node and said next intermediate node or said destination node in respective dynamically available transmission modalities whereby each dynamically selectable communications link allows transfer of said predetermined quantity of data to a next dynamically selected communications link in said communications pathway, wherein respective communications between said source node and said destination node may pass through one or more different dynamically selectable communications links due to different transmission conditions at different times and/or different dynamically available transmission modalities in communications range of said source node and/or said destination node at different communication times as the source node, the destination node and/or any destination nodes move into and out of range of each other.

2. A method as in claim 1, further comprising connecting at least one of said dynamically selectable communications links to an existing fixed node network, an existing wireless network, or a combination of an existing fixed node network and an existing wireless network using point-to-point or multicast links.

3. A method as in claim 1, further comprising placing said intermediate node on a vehicle.

4. A method as in claim 1, further comprising distributing routing intelligence to each node in said communication pathway.

5. A method as in claim 1, further comprising prefetching data based on a present location and/or a predicted location of a moving node in said communication pathway.

6. A method as in claim 1, further comprising establishing a chain of communications links of a plurality of vehicles having respective intermediate nodes, wherein at least one vehicle at any given time is in range of said source node and/or said destination node and each vehicle is in range of a next vehicle so as to establish said chain of communications links from vehicle to vehicle, whereby at any point in time said predetermined quantity of data may be transmitted between said source node and said destination node via said chain of communications links.

7. A method as in claim 1, further comprising performing predictive caching at at least one of said intermediate nodes.

8. A method as in claim 7, further comprising aggregating communications for transmission to certain geographically located users via multi-casting.

9. A method as in claim 1, further comprising selecting a dynamically selectable communications link using a predictive link selection model that anticipates the probability of any given communication link in said communication pathway being interfered with by another communication link.

10. A method as in claim 1, further comprising establishing an infrared, radiofrequency, or microwave communication link between said intermediate node and said next intermediate node where said next intermediate node is located on an unmanned aircraft.

11. An intermediate node in a communication pathway between a source node and a destination node in an ad hoc communications network configured for transmission of a predetermined quantity of data between said source node and said destination node, comprising:

means for establishing a communications link between said source node and said intermediate node when said source node and/or said intermediate node move into and out of range of each other, said communications link establishing means *for* maintaining said source node and said intermediate node in wireless communication range of each other in a selected wireless transmission modality for a time interval sufficient to permit transmission of said predetermined quantity of data from said source node to said intermediate node; and means for dynamically reconfiguring an ad hoc communications pathway between said intermediate node and said destination node based on dynamically changing transmission conditions and available transmission modalities therebetween as said intermediate node and a next intermediate node or said destination node move into and out of range of each other in said ad hoc communications pathway by dynamically selecting dynamically selectable communications links between said intermediate node and a next intermediate node or said destination node in respective dynamically available transmission modalities whereby each dynamically selectable communications link allows transfer of said predetermined quantity of data to a next dynamically selected communications link in said communications pathway, wherein respective communications between said source node and said destination node may pass through one or more different dynamically selectable communications links due to different transmission conditions at different times and/or different dynamically available transmission modalities in communications range of said source node and/or said destination node at different communication times as the source node, the destination node and/or any destination nodes move into and out of range of each other.

12. An intermediate node as in claim 11, wherein at least one of said dynamically selectable communications links is connected to an existing fixed node network, an existing wireless network, or a combination of an existing fixed node network and an existing wireless network using point-to-point or multicast links.

13. An intermediate node as in claim 11, wherein said intermediate node is located on a vehicle.

14. An intermediate node as in claim 11, wherein said dynamically reconfiguring means comprises communication link selection intelligence that selects said next dynamically selected communications link.

15. An intermediate node as in claim 11, wherein said dynamically reconfiguring means further comprises means for prefetching data based on a present location and/or a predicted location of a moving node in said communication pathway.

16. An intermediate node as in claim 11, wherein said dynamically reconfiguring means comprises means for performing predictive caching.

17. An intermediate node as in claim 16, wherein said dynamically reconfiguring means further comprises means for aggregating communications for transmission to certain geographically located users via multi-casting.

18. An intermediate node as in claim 11, wherein said dynamically reconfiguring means further comprises means for selecting a dynamically selectable communications link using a predictive link selection model that anticipates the probability of any given communication link in said communication pathway being interfered with by another communication link.

19. An intermediate node as in claim 11, further comprising means for establishing an infrared, radiofrequency, or microwave communication link between said intermediate node and said next intermediate node where said next intermediate node is located on an unmanned aircraft.

* * * * *